United States Patent
Li et al.

(10) Patent No.: US 12,159,970 B2
(45) Date of Patent: Dec. 3, 2024

(54) ELECTROLYTIC SOLUTION AND ELECTROCHEMICAL DEVICE USING THE SAME

(71) Applicant: Ningde Amperex Technology Limited, Fujian (CN)

(72) Inventors: Wenqiang Li, Fujian (CN); Juan Ma, Fujian (CN); Chao Tang, Fujian (CN); Junfei Liu, Fujian (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 550 days.

(21) Appl. No.: 17/362,730

(22) Filed: Jun. 29, 2021

(65) Prior Publication Data

US 2022/0123363 A1 Apr. 21, 2022

Related U.S. Application Data

(63) Continuation of application No. PCT/CN2020/073224, filed on Jan. 20, 2020.

(30) Foreign Application Priority Data

Jan. 25, 2019 (CN) .......................... 201910072555.X

(51) Int. Cl.
*H01M 10/0567* (2010.01)
*H01M 10/0525* (2010.01)

(52) U.S. Cl.
CPC ... *H01M 10/0567* (2013.01); *H01M 10/0525* (2013.01); *H01M 2300/0025* (2013.01)

(58) Field of Classification Search
CPC ......... H01M 10/0567; H01M 10/0525; H01M 2300/0025
USPC ....................................................... 429/188
See application file for complete search history.

(56) References Cited

U.S. PATENT DOCUMENTS

| | | | |
|---|---|---|---|
| 2015/0072247 A1 | 3/2015 | Cho et al. | |
| 2016/0322669 A1* | 11/2016 | Sawa | ................ H01M 10/0569 |
| 2017/0162906 A1* | 6/2017 | Nakazawa | ............ H01M 4/587 |
| 2017/0365855 A1 | 12/2017 | Ryu et al. | |

FOREIGN PATENT DOCUMENTS

| | | | | |
|---|---|---|---|---|
| CN | 1328355 | 12/2001 | | |
| CN | 103199302 | 7/2013 | | |
| CN | 105591158 | 5/2016 | | |
| CN | 105655642 | 6/2016 | | |
| CN | 105958110 | 9/2016 | | |
| CN | 106415910 | 2/2017 | | |
| CN | 108242567 | 7/2018 | | |
| CN | 109119688 | 1/2019 | | |
| CN | 109244529 | 1/2019 | | |
| CN | 109786835 | 5/2019 | | |
| JP | 2015181106 A | * 10/2015 | .......... | H01M 10/052 |
| KR | 20160060449 A | * 5/2016 | .......... | H01M 10/052 |

OTHER PUBLICATIONS

Gallus et al., New Insights into the Structure-Property Relationship of High-Voltage Electrolyte Components for Lithium-Ion Batteries Using the pKa Value, Dec. 1, 2015, Electrochimica Acta, 184, pp. 412-414 (Year: 2015).*
Li, Wenqiang; First Office Action for Chinese Patent Application No. 201910072555.X, filed Jan. 25, 2019, mailed May 26, 2020, 24 pages.
Li, Wenqiang; International Search Report and Written Opinion for PCT Application No. PCT/CN2020/073224, filed Jan. 20, 2020; mailed Apr. 17, 2020; 10 pages.
Li, Wenqiang; Second Office Action for Chinese Patent Application No. 201910072555.X, filed Jan. 25, 2019, mailed Feb. 1, 2021, 25 pages.
Li, Wenqiang; Third Office Action for Chinese Patent Application No. 201910072555.X, filed Jan. 25, 2019, mailed May 26, 2021, 19 pages.

* cited by examiner

*Primary Examiner* — Pamela H Weiss
*Assistant Examiner* — John S Medley
(74) *Attorney, Agent, or Firm* — XSENSUS LLP

(57) ABSTRACT

An electrolytic solution includes a compound containing a —CN functional group

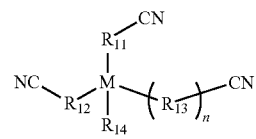

and a compound containing a silicon functional group. M is C or Si. $R_{11}$, $R_{12}$, and $R_{13}$ are each independently selected from a substituted or non-substituted $C_1$-$C_{12}$ alkylene group, a substituted or non-substituted $C_2$-$C_{12}$ alkenylene group, an O—R group, an $R_0$—S—R group or an $R_0$—O—R group, $R_0$ and R are each independently selected from a substituted or non-substituted $C_1$-$C_6$ alkylene group. n is 0 or 1. $R_{14}$ is H, fluorine, a cyano group, a substituted or non-substituted $C_1$-$C_{12}$ alkyl group, a substituted or non-substituted $C_2$-$C_{12}$ alkenyl group, an O—$R_1$ group, an $R_0$—S—$R_1$ group, or an $R_0$—O—$R_1$ group. $R_0$ is a substituted or non-substituted $C_1$-$C_6$ alkylene group, and $R_1$ is a substituted or non-substituted $C_1$-$C_6$ alkyl group.

19 Claims, No Drawings

ELECTROLYTIC SOLUTION AND ELECTROCHEMICAL DEVICE USING THE SAME

CROSS REFERENCE TO RELATED APPLICATIONS

The present application is a continuation of PCT International Application No. PCT/CN2020/073224, filed Jan. 20, 2020, which claims the benefit of priority from China Patent Application No. 201910072555.X, filed on Jan. 25, 2019, the disclosure of which is hereby incorporated by reference in its entirety.

BACKGROUND

1. Technical Field

The present application relates to the field of electrochemical device technologies, and more particularly to an electrolytic solution and an electrochemical device using the same.

2. Description of the Related Art

With the popularization and application of intelligent electronic products such as mobile phones, notebook computers, and cameras, the safety of using such products in a harsh environment has gradually become of concern and interest to a lot of people. As essential power supplies of electronic products, lithium ion batteries have been widely applied in such products by replacing conventional Ni—Cd and MH—Ni batteries. However, as electronic products have been developed to be lighter, thinner, and more portable, people have increasingly higher requirements and expectations for lithium ion batteries. It has become an urgent priority to develop a safe lithium ion battery which can resist high temperatures and various adverse conditions. Moreover, batteries on the market often swell, automatically shut down after being used for a period of time, or even may burn and/or explode. Therefore, the market now has much higher expectations for the safety performance of batteries during use. How to improve the safety of the lithium ion batteries and inhibit an increase in impedance after use are difficult problems to be solved.

SUMMARY

The present application provides an electrolytic solution and an electrochemical device using the same, in an attempt to resolve at least one problem in the related field at least to a certain extent.

According to some embodiments, the present application provides an electrolytic solution, including a compound containing a —CN functional group and a compound containing a silicon functional group, wherein the compound containing a —CN functional group includes a compound represented by formula I-A:

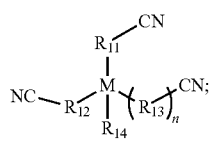

(I-A)

wherein M is at least one selected from the group consisting of N, P, C, and Si;

$R_{11}$, $R_{12}$, and $R_{13}$ are each independently selected from a substituted or non-substituted $C_1$-$C_{12}$ alkylene group, a substituted or non-substituted $C_2$-$C_{12}$ alkenylene group, an O—R group, an $R_0$—S—R group or an $R_0$—O—R group, $R_0$ and R being independently selected from a substituted or non-substituted $C_1$-$C_6$ alkylene group;

n is selected from 0 or 1;

$R_{14}$ is selected from H, fluorine, a cyano group, a substituted or non-substituted $C_1$-$C_{12}$ alkyl group, a substituted or non-substituted $C_2$-$C_{12}$ alkenyl group, an O—$R_1$ group, an $R_0$—S—$R_1$ group, or an $R_0$—O—$R_1$ group, $R_0$ being selected from a substituted or non-substituted $C_1$-$C_6$ alkylene group, and $R_1$ being selected from a substituted or non-substituted $C_1$-$C_6$ alkyl group; and when being substituted, a substituent is selected from a halogen, a cyano group, a $C_1$-$C_6$ alkyl group, a $C_2$-$C_6$ alkenyl group or any combination thereof; and when M is N or P, only three of $R_{11}$, $R_{12}$, $R_{13}$, and $R_{14}$ are present.

According to some embodiments, the compound containing a silicon functional group includes at least one of a compound represented by formula II-A and a compound represented by formula II-B:

(II-A)

(II-B)

wherein $R_{21}$ and $R_{22}$ are each independently selected from $R^a$, $C(R')_3$ or Si—$(R'')_3$;

wherein each $R^a$ is independently selected from a $C_1$-$C_{12}$ alkyl group, a $C_1$-$C_{12}$ alkoxy group, a $C_2$-$C_{12}$ alkenyl group, a $C_1$-$C_{10}$ heterocyclyl group or a $C_6$-$C_{26}$ aryl group;

wherein each of R' and R" is independently selected from H, F, a $C_1$-$C_{12}$ alkyl group, a $C_1$-$C_{12}$ alkoxy group, a $C_2$-$C_{12}$ alkenyl group, a $C_1$-$C_{10}$ heterocyclyl group or a $C_6$-$C_{26}$ aryl group;

wherein at least one of $R_{21}$ and $R_{22}$ contains Si;

wherein $R_{23}$ and $R_{24}$ are each independently selected from $R^a$ or Si—$(R'')_3$;

wherein each of $R^a$ and R" is independently selected from H, a $C_1$-$C_{12}$ alkyl group, a $C_2$-$C_{12}$ alkenyl group, a $C_1$-$C_{10}$ heterocyclyl group or a $C_6$-$C_{26}$ aryl group; and wherein at least one of $R_{23}$ and $R_{24}$ contains Si.

According to some embodiments, at least one of $R_{21}$ and $R_{22}$ contains an F atom.

According to some embodiments, at least one of $R_{23}$ and $R_{24}$ contains an F atom.

According to some embodiments, the compound containing a —CN functional group includes at least one of the following compounds:
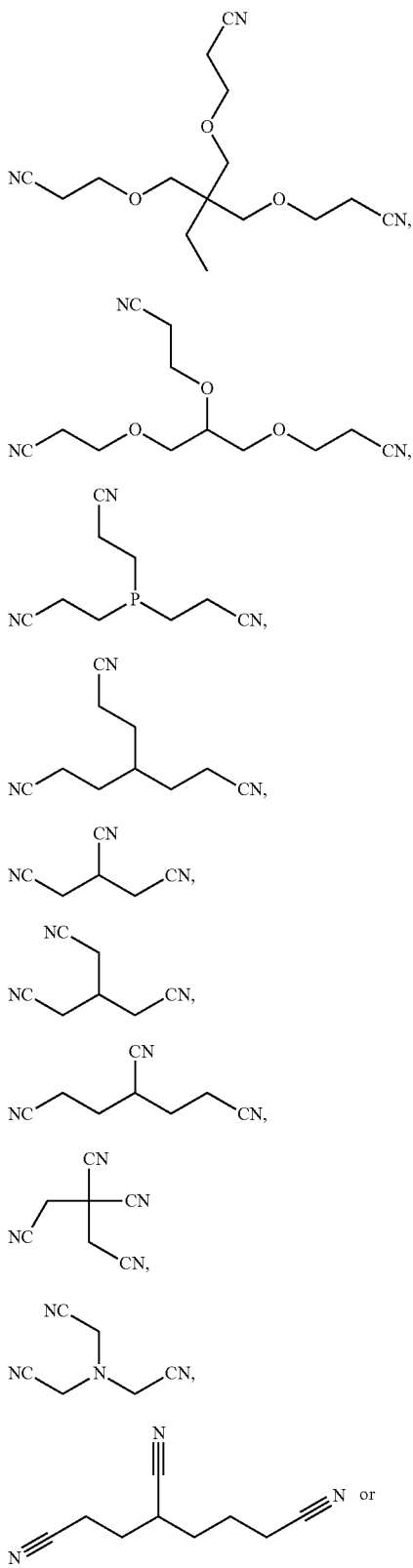
According to some embodiments, the compound containing a silicon functional group includes at least one of the following compounds:

-continued

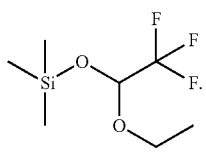
(II-10)

According to some embodiments, based on a total weight of the electrolytic solution, the weight percentage of the compound containing a —CN functional group is about 0.01 wt % to about 10 wt %, and the weight percentage of the compound containing a silicon functional group is about 0.001 wt % to about 30 wt %.

According to some embodiments, the electrolytic solution further includes a compound containing a sulfur-oxygen double bond functional group, and the compound containing a sulfur-oxygen double bond functional group includes a compound represented by formula III-A:

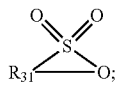
(III-A)

wherein $R_{31}$ is selected from a substituted or non-substituted $C_1$-$C_{12}$ alkylene group, a substituted or non-substituted $C_2$-$C_{12}$ alkenylene group, a heteroatom-containing substituted or non-substituted $C_1$-$C_{12}$ alkylene group, or a heteroatom-containing substituted or non-substituted $C_2$-$C_{12}$ alkenylene group;

wherein when being substituted, a substituent is selected from a halogen, a $C_1$-$C_6$ alkyl group, a $C_2$-$C_6$ alkenyl group or any combination thereof; and wherein the heteroatom is selected from O, S, P or any combination thereof.

According to some embodiments, the compound containing a sulfur-oxygen double bond functional group includes at least one of the following compounds:

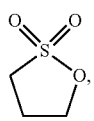
(formula III-1)

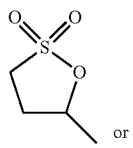
(formula III-2)

or

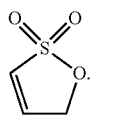
(formula III-3)

According to some embodiments, based on the total weight of the electrolytic solution, the weight percentage of the compound containing a sulfur-oxygen double bond functional group is about 0.01 wt % to about 15 wt %.

According to some embodiments, the electrolytic solution further includes a boron-containing compound, and the boron-containing compound includes a compound represented by formula IV-A:

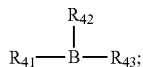
(IV-A)

wherein $R_{41}$, $R_{42}$, and $R_{43}$ are each independently selected from $R^b$—Si—$(R^c)_3$, a substituted or non-substituted $C_1$-$C_{12}$ alkyl group, a substituted or non-substituted $C_1$-$C_{12}$ alkoxy group, a substituted or non-substituted $C_2$-$C_{12}$ alkenyl group, a substituted or non-substituted $C_6$-$C_{26}$ aryl group, or a substituted or non-substituted $C_3$-$C_{10}$ cyclohydrocarbon group;

wherein $R^b$ is selected from a substituted or non-substituted $C_1$-$C_{12}$ alkylene group, a substituted or non-substituted $C_2$-$C_{12}$ alkenylene group, a substituted or non-substituted $C_6$-$C_{10}$ cycloalkylene group, or a substituted or non-substituted $C_6$-$C_{26}$ arylene group;

wherein $R^c$ is selected from H, F, a substituted or non-substituted $C_1$-$C_{12}$ alkyl group, a substituted or non-substituted $C_1$-$C_{12}$ alkoxy group, a substituted or non-substituted $C_2$-$C_{12}$ alkenyl group, a substituted or non-substituted $C_6$-$C_{10}$ cyclohydrocarbon group, or a substituted or non-substituted $C_6$-$C_{26}$ aryl group; and wherein when being substituted, a substituent is selected from a halogen, a $C_1$-$C_6$ alkyl group, a $C_1$-$C_6$ alkenyl group, a cyano group or any combination thereof.

According to some embodiments, the boron-containing compound includes at least one of the following compounds:

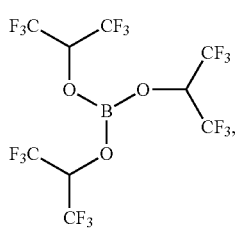
(formula IV-1)

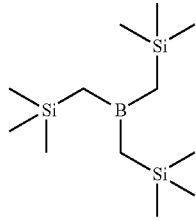
(formula IV-2)

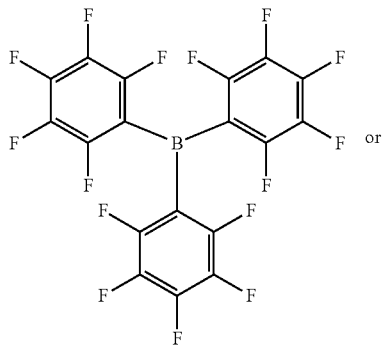
(formula IV-3)

or (formula (IV-4))

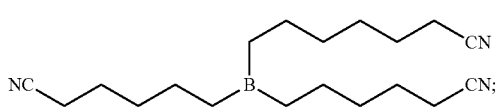

and based on the total weight of the electrolytic solution, the weight percentage of the boron-containing compound is about 0.01 wt % to about 10 wt %.

According to some embodiments, the electrolytic solution further includes an isocyanurate compound, and the isocyanurate compound includes a compound represented by formula V-A:

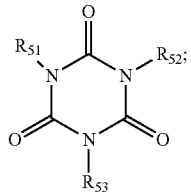

(V-A)

wherein, $R_{51}$, $R_{52}$, and $R_{53}$ are each independently selected from H, a halogen, a substituted or non-substituted $C_1$-$C_{12}$ alkyl group, a substituted or non-substituted $C_2$-$C_{12}$ alkenyl group, a substituted or non-substituted $C_6$-$C_{26}$ aryl group, or a substituted or non-substituted $C_1$-$C_{10}$ heterocyclyl group; and wherein, when being substituted, a substituent is selected from a halogen, a $C_1$-$C_6$ alkyl group, a $C_2$-$C_6$ alkenyl group or any combination thereof.

According to some embodiments, the isocyanurate compound includes at least one of the following compounds:

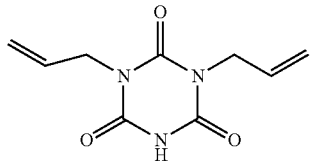

(formula V-1)

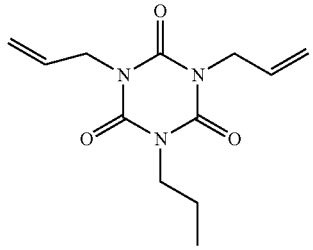

(formula V-2)

or

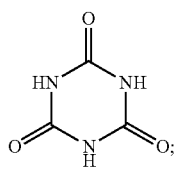

(formula V-3)

based on the total weight of the electrolytic solution, the weight percentage of the isocyanurate compound is about 0.01 wt % to about 10 wt %.

According to some embodiments, the electrolytic solution further includes a lithium salt additive, and the lithium salt additive includes at least one of the following lithium salts: lithium bistrifluoromethanesulfonimide, lithium bis(fluorosulfonyl)imide, lithium bisoxalatoborate, lithium tetrafluorooxalatophosphate, lithium difluorooxalatoborate or lithium difluorophosphate, and based on the total weight of the electrolytic solution, the weight percentage of the additive is about 0.01 wt % to about 10 wt %.

Another embodiment of the present application provides an electrochemical device, wherein the electrochemical device includes the electrolytic solution according to any of the foregoing embodiments.

Another embodiment of the present application provides an electronic device, wherein the electronic device includes the electronic device according to any of the foregoing embodiments.

The electrolytic solution according to the present application includes a compound containing a —CN functional group and a compound containing a silicon functional group, wherein the compound containing a —CN functional group and the compound containing a silicon functional group can improve the safety performance of the electrolytic solution, thereby improving the temperature cycling performance of a battery, and alleviating an external short circuit phenomenon due to extrusion and an external short circuit phenomenon due to high temperature.

Additional aspects and advantages of the embodiments of the present application are partially described and displayed in the following description, or illustrated through the implementation of the embodiments of the present application.

DETAILED DESCRIPTION

As used herein, the term "about" is used to describe and illustrate small changes. When used in connection with an event or a circumstance, the term may refer to an example in which the event or circumstance occurs precisely, and an example in which the event or circumstance occurs approximately. For example, when used in connection with a value, the term "about" may refer to a range of variation less than or equal to ±10% of the stated value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

In the specific embodiments and claims, a list of items connected by the term "one of" or a similar term may mean any of all the items listed. For example, if items A and B are listed, the phrase "one of A and B" means only A or only B. In another example, if items A, B, and C are listed, the phrase "one of A, B, and C" means only A, only B, or only C. The item A may include a single element or a plurality of elements. The item B may include a single element or a plurality of elements. The item C may include a single element or a plurality of elements.

In the specific embodiments and claims, a list of items connected by the term "at least one of" or a similar term may mean any combination of all the items listed. For example, if items A and B are listed, the phrase "at least one of A and B" means only A, only B, or A and B. In another example, if items A, B, and C are listed, the phrase "at least one of A, B, and C" means only A, only B, only C, A and B (excluding C), A and C (excluding B), or all of A, B, and C. The item A may include a single element or a plurality of elements. The item B may include a single element or a plurality of elements. The item C may include a single element or a plurality of elements.

In addition, amounts, ratios, and other values are sometimes presented in a range format in the present application. It is to be understood that such a range format is provided for the sake of convenience and simplicity, and should be understood flexibly to include not only the numerical values that are explicitly defined in the range, but also all the individual values or sub-ranges that are included in the range, as if each value and sub-range are explicitly specified.

As used herein, the "alkyl group" is intended to be a linear saturated hydrocarbon structure having 1 to 20 carbon atoms. The "alkyl group" is also intended to be a branched or cyclic hydrocarbon structure having 3 to 20 carbon atoms. For example, the alkyl group may be an alkyl group having 1 to 20 carbon atoms, an alkyl group having 1 to 10 carbon atoms, an alkyl group having 1 to 5 carbon atoms, an alkyl group having 5 to 20 carbon atoms, an alkyl group having 5 to 15 carbon atoms, or an alkyl group having 5 to 10 carbon atoms. When an alkyl group having a specific carbon number is defined, it is intended to cover all geometric isomers having the carbon number. Therefore, for example, "butyl" means n-butyl, sec-butyl, isobutyl, tert-butyl and cyclobutyl; and "propyl" includes n-propyl, isopropyl and cyclopropyl. Examples of the alkyl group include, but are not limited to, methyl, ethyl, n-propyl, isopropyl, cyclopropyl, n-butyl, isobutyl, sec-butyl, tert-butyl, cyclobutyl, n-pentyl, isoamyl, neopentyl, cyclopentyl, methylcyclopentyl, ethylcyclopentyl, n-hexyl, isohexyl, cyclohexyl, n-heptyl, octyl, cyclopropyl, cyclobutyl, norbornanyl and the like. In addition, the alkyl group can be optionally substituted.

As used herein, the term "alkylene group" means a linear or branched divalent saturated hydrocarbon group. For example, the alkylele group may be an alkylene group having 1 to 20 carbon atoms, an alkylene group having 1 to 15 carbon atoms, an alkylene group having 1 to 10 carbon atoms, an alkylene group having 1 to 5 carbon atoms, an alkylene group having 5 to 20 carbon atoms, an alkylene group having 5 to 15 carbon atoms, or alkylene group having 5 to 10 carbon atoms. Representative alkylene groups include (for example) methylene, ethane-1,2-diyl ("ethylene"), propane-1,2-diyl, propane-1,3-diyl, butane-1,4-diyl, pentane-1,5-diyl and the like. In addition, the alkylene group can be optionally substituted.

As used herein, the term "alkenylene group" covers both linear and branched alkenylene groups. When an alkenylene group having a specific carbon number is defined, it is intended to cover all geometric isomers having the carbon number. For example, the alkenylele group may be an alkenylene group having 2 to 20 carbon atoms, an alkenylene group having 2 to 15 carbon atoms, an alkenylene group having 2 to 10 carbon atoms, an alkenylene group having 2 to 5 carbon atoms, an alkenylene group having 5 to 20 carbon atoms, an alkenylene group having 5 to 15 carbon atoms, or an alkenylene group having 5 to 10 carbon atoms. Representative alkenylene groups include (for example) vinylyl, allylidene, butenylidene, and the like. In addition, the alkenylene group can be optionally substituted.

As used herein, the term "aryl group" covers both monocyclic and polycyclic systems. A polycyclic ring may have two or more rings in which two carbons are shared by two adjacent rings (wherein the rings are "fused"), wherein at least one of the rings is aromatic and other rings may be for example, a cycloalkyl group, a cycloalkenyl group, an aryl group, a heterocyclyl group and/or a heteroaryl group. For example, the aryl group may be a $C_6$-$C_{50}$ aryl group, a $C_6$-$C_{40}$ aryl group, a $C_6$-$C_{30}$ aryl group, a $C_6$-$C_{20}$ aryl group, or a $C_6$-$C_{10}$ aryl group. Representative aryl groups include (for example) phenyl, methylphenyl, propylphenyl, isopropylphenyl, benzyl and naphthalen-1-yl, naphthalen-2-yl and the like. In addition, the aryl group can be optionally substituted.

As used herein, the term "cyclohydrocarbon group" covers cyclic hydrocarbon groups. For example, the cyclohydrocarbon group may be a cyclohydrocarbon group having 3 to 20 carbon atoms, a cyclohydrocarbon group having 3 to 15 carbon atoms, a cyclohydrocarbon group having 3 to 10 carbon atoms, a cyclohydrocarbon group having 3 to 6 carbon atoms, a cyclohydrocarbon group having 5 to 20 carbon atoms, a cyclohydrocarbon group having 5 to 15 carbon atoms, or a cyclohydrocarbon group having 5 to 10 carbon atoms. In addition, the cyclohydrocarbon group can be optionally substituted. For example, the cyclohydrocarbon group may be substituted with a halogen including fluorine, chlorine, bromine, and iodine, an alkyl group, an aryl group or a heteroaryl group.

As used herein, the term "cycloalkylene group" covers cyclic alkylene groups. For example, the cycloalkylene group may be a cycloalkylene group having 3 to 20 carbon atoms, a cycloalkylene group having 3 to 15 carbon atoms, a cycloalkylene group having 3 to 10 carbon atoms, a cycloalkylene group having 3 to 6 carbon atoms, a cycloalkylene group having 5 to 20 carbon atoms, a cycloalkylene group having 5 to 15 carbon atoms, or a cycloalkylene group having 5 to 10 carbon atoms. In addition, the cycloalkylene group can be optionally substituted. For example, the cycloalkylene group can be substituted with a halogen including fluorine, chlorine, bromine, and iodine, an alkyl group, an aryl group or a heteroaryl group.

As used herein, the term "alkenyl group" refers to a monovalent unsaturated hydrocarbon group which may be straight or branched and which has at least one and usually 1, 2 or 3 carbon-carbon double bonds. Unless otherwise defined, the alkenyl group typically contains 2 to 20 carbon atoms, and may be, for example, an alkenyl group having 2 to 20 carbon atoms, an alkenyl group having 6 to 20 carbon atoms, an alkenyl group having 2 to 12 carbon atoms or an alkenyl group having 2 to 6 carbon atoms. Representative alkenyl groups include (for example) ethenyl, n-propenyl, iso-propenyl, n-but-2-enyl, butyl-3-enyl, n-hex-3-enyl, and the like. In addition, the alkenyl group can be optionally substituted.

As used herein, the term "alkoxy group" may be an alkoxy group having 1 to 20 carbon atoms, an alkoxy group having 1 to 10 carbon atoms, an alkoxy group having 1 to 5 carbon atoms, an alkoxy group having 5 to 20 carbon atoms, an alkoxy group having 5 to 15 carbon atoms, or an alkoxy group having 5 to 10 carbon atoms.

As used herein, the term "heterocyclyl group" covers aromatic and non-aromatic cyclic groups. Heteroaromatic cyclic groups also mean heteroaryl groups. In some embodiments, the heteroaromatic cyclic group and hetero-non-aromatic cyclic group include a $C_1$-$C_{50}$ heterocyclyl group, $C_1$-$C_{40}$ heterocyclyl group, $C_1$-$C_{30}$ heterocyclyl group, $C_1$-$C_{20}$ heterocyclyl group, $C_1$-$C_{10}$ heterocyclyl group, or $C_1$-$C_6$ heterocyclyl group having at least one heteroatom, for example, morpholinyl, piperidinyl, pyrrolidinyl, and a cyclic ether such as tetrahydrofuran or tetrahydropyran. In addition, the heterocyclic group can be optionally substituted.

As used herein, the term "arylene group" covers both monocyclic and polycyclic systems. A polycyclic ring may have two or more rings in which two carbons are shared by two adjacent rings (wherein the rings are "fused"), in which at least one of the rings is aromatic and other rings may be a cycloalkyl group, a cycloalkenyl group, an aryl group, a heterocyclyl group and/or a heteroaryl group. For example, the arylene group may be a $C_6$-$C_{50}$ arylene group, a $C_6$-$C_{40}$ arylene group, a $C_6$-$C_{30}$ arylene group, a $C_6$-$C_{20}$ arylene group, or a $C_6$-$C_{10}$ arylene group. In addition, the arylene group can be optionally substituted.

As used herein, the term "halogen" covers F, Cl, Br and I.

When the foregoing substituent groups are substituted, substituent groups thereof may be independently selected from a group consisting of a halogen, an alkyl group, a cyclic hydrocarbon group, an alkenyl group, and an aryl group.

As used herein, the content of each component is calculated based on the total weight of the electrolytic solution.

I. Electrolytic Solution

An embodiment of the present application provides an electrolytic solution, including an electrolyte and a solvent in which the electrolyte is dissolved. The electrolytic solution provided in the present application includes a compound containing a —CN functional group and a compound containing a silicon functional group, and the compound containing a —CN functional group includes a compound represented by formula I-A:

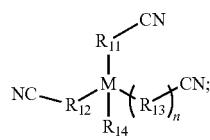

(I-A)

wherein M is at least one selected from the group consisting of N, P, C, and Si;

$R_{11}$, $R_{12}$, and $R_{13}$ are each independently selected from a substituted or non-substituted $C_1$-$C_{20}$ alkylene group, a substituted or non-substituted $C_1$-$C_{12}$ alkylene group, a substituted or non-substituted $C_1$-$C_6$ alkylene group, a substituted or non-substituted $C_2$-$C_{20}$ alkenylene group, a substituted or non-substituted $C_2$-$C_{12}$ alkenylene group, a substituted or non-substituted $C_2$-$C_6$ alkenylene group, an O—R group, an $R_O$—S—R group or an $R_O$—O—R group, wherein $R_O$ and R are each independently selected from a substituted or non-substituted $C_1$-$C_{12}$ alkylene group, or a substituted or non-substituted $C_1$-$C_6$ alkylene group;

n is selected from 0 or 1;

$R_{14}$ is selected from H, fluorine, a cyano group, a substituted or non-substituted $C_1$-$C_{20}$ alkyl group, a substituted or non-substituted $C_1$-$C_{12}$ alkyl group, a substituted or non-substituted $C_1$-$C_6$ alkyl group, a substituted or non-substituted $C_2$-$C_{20}$ alkenyl group, a substituted or non-substituted $C_2$-$C_{12}$ alkenyl group, a substituted or non-substituted $C_2$-$C_6$ alkenyl group, an O—$R_1$ group, an $R_O$—S—$R_1$ group, or an $R_O$—O—$R_1$ group, wherein $R_O$ is selected from a substituted or non-substituted $C_1$-$C_{12}$ alkylene group, a substituted or non-substituted $C_1$-$C_6$ alkylene group, and $R_1$ is selected from a substituted or non-substituted $C_1$-$C_{12}$ alkyl group, or a substituted or non-substituted $C_1$-$C_6$ alkyl group; and when being substituted, a substituent is selected from a halogen, a cyano group, a $C_1$-$C_6$ alkyl group, a $C_2$-$C_6$ alkenyl group or any combination thereof; and when M is N or P, only $R_{11}$, $R_{12}$, $R_{13}$ are present.

According to some embodiments, the compound containing a silicon functional group includes at least one of a compound represented by formula II-A and a compound represented by formula II-B:

(II-A)

(II-B)

wherein $R_{21}$ and $R_{22}$ are each independently selected from $R^a$, $C(R')_3$ or Si—$(R'')_3$;

each $R^a$ is independently selected from a $C_1$-$C_{20}$ alkyl group, a $C_1$-$C_{12}$ alkyl group, a $C_1$-$C_6$ alkyl group, a $C_1$-$C_{20}$ alkoxy group, a $C_1$-$C_{12}$ alkoxy group, a $C_1$-$C_6$ alkoxy group, a $C_2$-$C_{20}$ alkenyl group, a $C_2$-$C_{12}$ alkenyl group, a $C_2$-$C_6$ alkenyl group, a $C_1$-$C_{20}$ heterocyclyl group, a $C_1$-$C_{10}$ heterocyclyl group, a $C_6$-$C_{10}$ heterocyclyl group, a $C_6$-$C_{50}$ aryl group, a $C_6$-$C_{26}$ aryl group or a $C_6$-$C_{12}$ aryl group;

wherein each of R' and R'' is independently selected from H, F, a $C_1$-$C_{20}$ alkyl group, a $C_1$-$C_{12}$ alkyl group, a $C_1$-$C_6$ alkyl group, a $C_1$-$C_{20}$ alkoxy group, a $C_1$-$C_{12}$ alkoxy group, a $C_1$-$C_6$ alkoxy group, a $C_2$-$C_{20}$ alkenyl group, a $C_2$-$C_{12}$ alkenyl group, a $C_2$-$C_6$ alkenyl group, a $C_1$-$C_{20}$ heterocyclyl group, a $C_1$-$C_{10}$ heterocyclyl group, a $C_6$-$C_{10}$ heterocyclyl group, a $C_6$-$C_{50}$ aryl group, a $C_6$-$C_{26}$ aryl group or a $C_6$-$C_{12}$ aryl group;

wherein at least one of $R_{21}$ and $R_{22}$ contains Si;

wherein $R_{23}$ and $R_{24}$ are each independently selected from $R^a$ or Si—$(R'')_3$;

wherein each of $R^a$ and R'' is independently selected from H, a $C_1$-$C_{20}$ alkyl group, a $C_1$-$C_{12}$ alkyl group, a $C_1$-$C_6$ alkyl group, a $C_2$-$C_{20}$ alkenyl group, a $C_2$-$C_{12}$ alkenyl group, a $C_2$-$C_6$ alkenyl group, a $C_1$-$C_{20}$ heterocyclyl group, a $C_1$-$C_{10}$ heterocyclyl group, a $C_6$-$C_{10}$ heterocyclyl group, a $C_6$-$C_{50}$ aryl group, a $C_6$-$C_{26}$ aryl group or a $C_6$-$C_{12}$ aryl group; and wherein at least one of $R_{23}$ and $R_{24}$ contains Si.

In some embodiments, at least one of $R_{21}$ and $R_{22}$ contains an F atom.

In some embodiments, at least one of $R_{23}$ and $R_{24}$ contains an F atom.

In some embodiments, the compound containing a —CN functional group includes at least one of the following compounds:

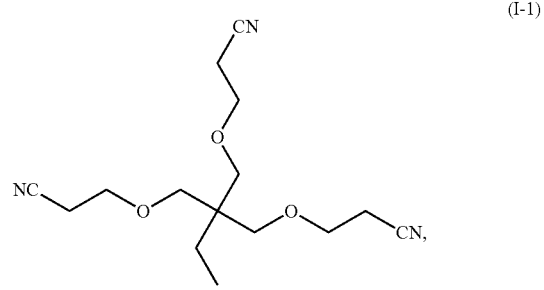

(I-1)

-continued
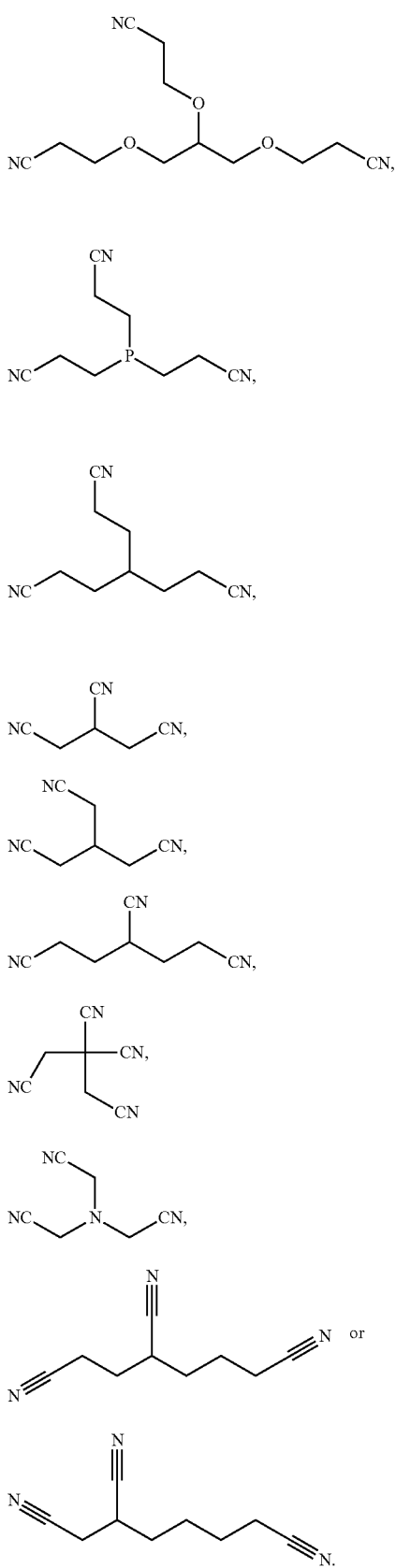
In some embodiments, the compound containing a silicon functional group includes at least one of the following compounds:
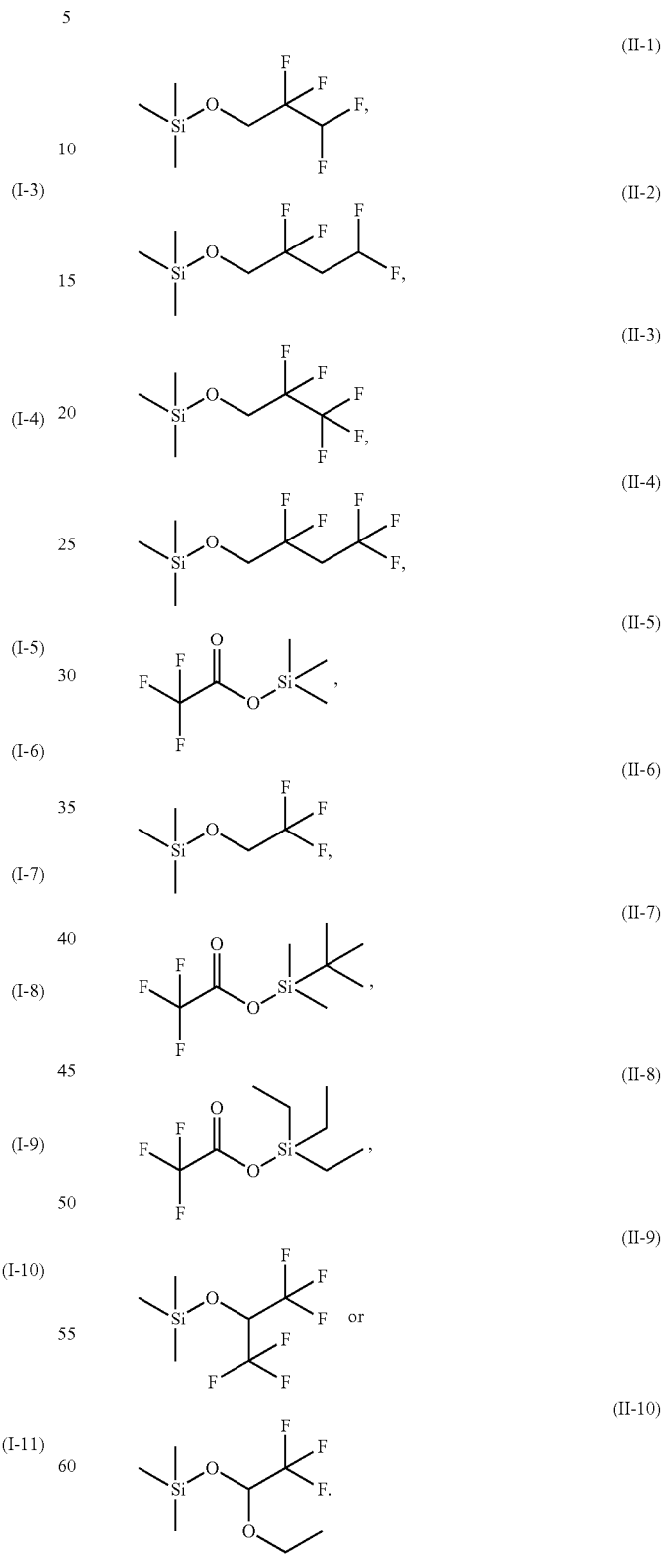
In some embodiments, based on the total weight of the electrolytic solution, the weight percentage of the compound containing a —CN functional group is about 0.01 wt % to about 10 wt %. In some embodiments, based on the total weight of the electrolytic solution, the weight percentage of the compound containing a —CN functional group is not greater than about 10 wt %, not greater than about 5 wt %, not greater than about 4 wt %, not greater than about 3 wt %, not greater than about 2.0 wt %, not greater than about 1.5 wt %, or not greater than about 1.0 wt %. In some embodiments, based on the total weight of the electrolytic solution, the weight percentage of the compound containing a —CN functional group is not less than about 0.1 wt %, not less than about 0.3 wt %, not less than about 0.5 wt % or not less than about 0.6 wt %. In some embodiments, based on the total weight of the electrolytic solution, the weight percentage of the compound containing a —CN functional group is about 0.1 wt % to about 5 wt %.

In some embodiments, based on the total weight of the electrolytic solution, the weight percentage of the compound containing a silicon functional group is about 0.001 wt %~30 wt %. In some embodiments, based on the total weight of the electrolytic solution, the weight percentage of the compound containing a silicon functional group is not greater than about 30 wt %, not greater than about 20 wt %, not greater than about 10 wt % or not greater than about 7 wt %. In some embodiments, based on the total weight of the electrolytic solution, the weight percentage of the compound containing a silicon functional group is not less than about 2 wt %, not less than about 3 wt %, not less than about 4 wt % or not less than about 5 wt %.

In some embodiments, the electrolytic solution optionally further includes a compound containing a sulfur-oxygen double bond functional group, and the compound containing a sulfur-oxygen double bond functional group includes a compound represented by formula III-A:

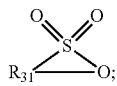

(III-A)

wherein $R_{31}$ is selected from a substituted or non-substituted $C_1$-$C_{20}$ alkylene group, a substituted or non-substituted $C_1$-$C_{12}$ alkylene group, a substituted or non-substituted $C_1$-$C_6$ alkylene group, a substituted or non-substituted $C_2$-$C_{20}$ alkenylene group, a substituted or non-substituted $C_2$-$C_{12}$ alkenylene group, a substituted or non-substituted $C_2$-$C_6$ alkenylene group, a heteroatom-containing substituted or non-substituted $C_1$-$C_{20}$ alkylene group, a heteroatom-containing substituted or non-substituted $C_1$-$C_{12}$ alkylene group, a heteroatom-containing substituted or non-substituted $C_1$-$C_6$ alkylene group, a heteroatom-containing substituted or non-substituted $C_2$-$C_{20}$ alkenylene group, a heteroatom-containing substituted or non-substituted $C_2$-$C_{12}$ alkenylene group, or a heteroatom-containing substituted or non-substituted $C_2$-$C_6$ alkenylene group;

when being substituted, a substituent is selected from a halogen, a $C_1$-$C_6$ alkyl group, a $C_2$-$C_6$ alkenyl group or any combination thereof; and the heteroatom is selected from O, S, P or any combination thereof.

In some embodiments, the compound containing a sulfur-oxygen double bond functional group includes at least one of the following compounds:

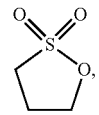

(formula III-1)

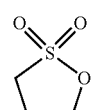

(formula III-2)

or

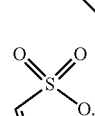

(formula III-3)

In some embodiments, based on the total weight of the electrolytic solution, the weight percentage of the compound containing a sulfur-oxygen double bond functional group is about 0.01 wt % to about 15 wt %. In some embodiments, based on the total weight of the electrolytic solution, the weight percentage of the compound containing a sulfur-oxygen double bond functional group is about 0.1 wt % to about 10 wt %. In some embodiments, based on the total weight of the electrolytic solution, the weight percentage of the compound containing a sulfur-oxygen double bond functional group is about 0.1 wt % to about 5 wt %. In some embodiments, based on the total weight of the electrolytic solution, the weight percentage of the compound containing a sulfur-oxygen double bond functional group is about 0.1 wt % to about 5 wt %. Based on the total weight of the electrolytic solution, the weight percentage of the compound containing a sulfur-oxygen double bond functional group is about 1 wt %, about 2 wt %, about 3 wt %, about 4 wt %, about 5 wt %, about 6 wt %, about 7 wt %, about 8 wt %, about 9 wt % or about 10 wt %.

Under the combined effect of the compound containing a sulfur-oxygen double bond functional group, the compound containing a —CN functional group, and the compound containing a silicon functional group, a stable organic protection film component can be formed so as to enhance the thermal stability of an organic film and reduce the side reactions between an active material and the electrolytic solution under high temperature, thereby improving the high-temperature storage performance of a battery.

In some embodiments, the electrolytic solution optionally further includes a boron-containing compound, and the boron-containing compound includes a compound represented by formula IV-A:

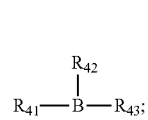

(IV-A)

wherein $R_{41}$, $R_{42}$, and $R_{43}$ are each independently selected from)$R^b$—Si—$(R^c)_3$, a substituted or non-substituted $C_1$-$C_{20}$ alkyl group, a substituted or non-substituted $C_1$-$C_{12}$ alkyl group, a substituted or non-substituted $C_1$-$C_6$ alkyl group, a substituted or non-substituted $C_1$-$C_{20}$ alkoxy group, a substituted or non-substituted $C_1$-$C_{12}$ alkoxy group, a substituted or non-substituted $C_1$-$C_6$ alkoxy group, a substituted or non-substituted $C_2$-$C_{20}$ alkenyl group, a substituted or non-substituted $C_2$-$C_{12}$ alkenyl group, a substituted or non-substituted $C_2$-$C_6$ alkenyl group, a substituted or non-substituted $C_6$-$C_{50}$ aryl group, a substituted or non-substituted $C_6$-$C_{26}$ aryl group, a substituted or non-substituted $C_6$-$C_{12}$ aryl group, a substituted or non-substituted $C_3$-$C_{20}$ cyclohydrocarbon group, a substituted or non-substituted $C_3$-$C_{10}$ cyclohydrocarbon group, or a substituted or non-substituted $C_3$-$C_6$ cyclohydrocarbon group;

wherein $R^b$ is selected from a substituted or non-substituted $C_1$-$C_{20}$ alkylene group, a substituted or non-substituted $C_1$-$C_{12}$ alkylene group, a substituted or non-substituted $C_1$-$C_6$ alkylene group, a substituted or non-substituted $C_2$-$C_{20}$ alkenylene group, a substituted or non-substituted $C_2$-$C_{12}$ alkenylene group, a substituted or non-substituted $C_2$-$C_6$ alkenylene group, a substituted or non-substituted $C_3$-$C_{20}$ cycloalkylene, a substituted or non-substituted $C_3$-$C_{10}$ cycloalkylene, a substituted or non-substituted $C_3$-$C_6$ cycloalkylene, a substituted or non-substituted $C_6$-$C_{50}$ arylene group, a substituted or non-substituted $C_6$-$C_{26}$ arylene group, or a substituted or non-substituted $C_6$-$C_{12}$ arylene group;

wherein $R^c$ is selected from H, F, a substituted or non-substituted $C_1$-$C_{20}$ alkyl group, a substituted or non-substituted $C_1$-$C_{12}$ alkyl group, a substituted or non-substituted $C_1$-$C_6$ alkyl group, a substituted or non-substituted $C_1$-$C_{20}$ alkoxy group, a substituted or non-substituted $C_1$-$C_{12}$ alkoxy group, a substituted or non-substituted $C_1$-$C_6$ alkoxy group, a substituted or non-substituted $C_2$-$C_{20}$ alkenyl group, a substituted or non-substituted $C_2$-$C_{12}$ alkenyl group, a substituted or non-substituted $C_2$-$C_6$ alkenyl group, a substituted or non-substituted $C_3$-$C_{20}$ cyclohydrocarbon group, a substituted or non-substituted $C_3$-$C_{10}$ cyclohydrocarbon group, a substituted or non-substituted $C_3$-$C_6$ cyclohydrocarbon group, a substituted or non-substituted $C_6$-$C_{00}$ aryl group, a substituted or non-substituted $C_6$-$C_{26}$ aryl group, or a substituted or non-substituted $C_6$-$C_{12}$ aryl group; and wherein when being substituted, a substituent is selected from a halogen, a $C_1$-$C_6$ alkyl group, a $C_1$-$C_6$ alkenyl group, a cyano group or any combination thereof.

In some embodiments, the boron-containing compound includes at least one of the following compounds:

(formula IV-1)
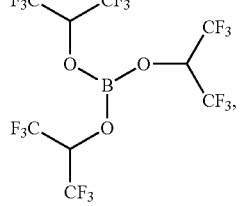

(formula IV-2)
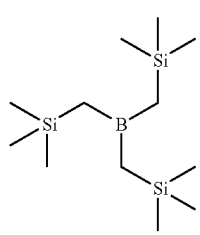

(formula IV-3)
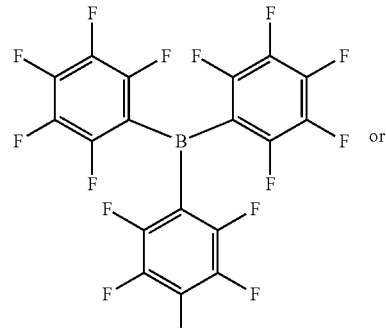 or (formula (IV-4))
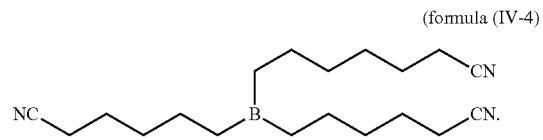

In some embodiments, based on the total weight of the electrolytic solution, the weight percentage of the boron-containing compound is about 0.01 wt % to about 10 wt %. In some embodiments, based on the total weight of the electrolytic solution, the weight percentage of the boron-containing compound is about 0.1 wt % to about 5 wt %. In some embodiments, based on the total weight of the electrolytic solution, the weight percentage of the boron-containing compound is about 1 wt %, about 2 wt %, about 3 wt %, about 4 wt %, about 5 wt %, about 6 wt %, about 7 wt %, about 8 wt % or about 9 wt %.

Under the combined effect of the boron-containing compound, the compound containing a —CN functional group, and the compound containing a silicon functional group, oxygen radicals at the cathode can be stabilized so as to reduce oxygen released by a cathode material, and transition metal and oxygen at the cathode are also protected, thereby enhancing protection for the cathode material, achieving a better improvement effect, reducing accumulation of side products on the surface of the cathode material, and reducing direct-current resistance.

In some embodiments, the electrolytic solution optionally further includes an isocyanurate compound, and the isocyanurate compound includes a compound represented by formula V-A:

(V-A)
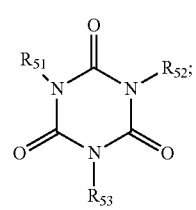

wherein $R_{51}$, $R_{52}$, and $R_{53}$ are each independently selected from H, a halogen, a substituted or non-substituted $C_1$-$C_{20}$ alkyl group, a substituted or non-substituted $C_1$-$C_{12}$ alkyl group, a substituted or non-substituted $C_1$-$C_6$ alkyl group, a substituted or non-substituted $C_2$-$C_{20}$ alkenyl group, a substituted or non-substituted $C_2$-$C_{12}$ alkenyl group, a substituted or non-substituted $C_2$-$C_6$ alkenyl group, a substituted or non-substituted $C_6$-$C_{50}$ aryl group, a substituted or non-substituted $C_6$-$C_{26}$ aryl group, a substituted or non-substituted $C_6$-$C_{12}$ aryl group, a substituted or non-substituted $C_1$-$C_{20}$ heterocyclyl group, a substituted or non-substituted $C_1$-$C_{10}$ heterocyclyl group, or a substituted or non-substituted $C_3$-$C_6$ heterocyclyl group; and wherein when substituted, a substituent is selected from a halogen, a $C_1$-$C_6$ alkyl group, a $C_2$-$C_6$ alkenyl group or any combination thereof.

In some embodiments, the isocyanurate compound includes at least one of the following compounds:

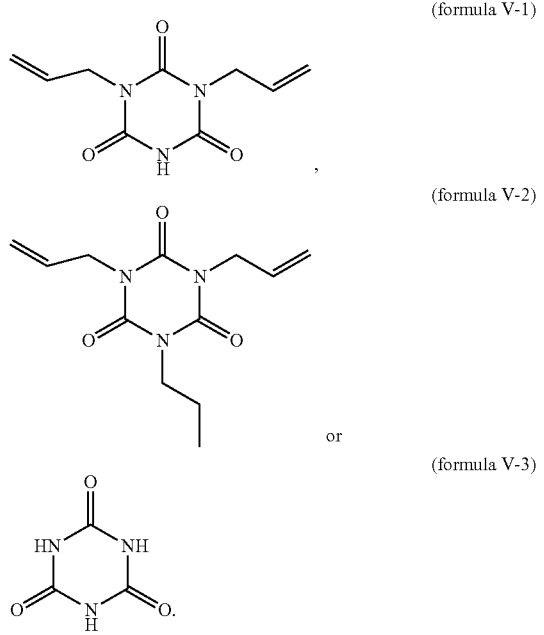

(formula V-1)

(formula V-2)

or (formula V-3)

In some embodiments, based on the total weight of the electrolytic solution, the weight percentage of the isocyanurate compound is about 0.01 wt % to about 10 wt %. In some embodiments, based on the total weight of the electrolytic solution, the weight percentage of the isocyanurate compound is about 0.1 wt % to about 5 wt %. In some embodiments, based on the total weight of the electrolytic solution, the weight percentage of the isocyanurate compound is about 1 wt %, about 2 wt %, about 3 wt %, about 4 wt %, about 5 wt %, about 6 wt %, about 7 wt %, about 8 wt % or about 9 wt %.

Under the combined effect of the isocyanurate, the compound containing a —CN functional group, and the compound containing a silicon functional group, a stable organic protection film can be formed at the anode easily, and the organic composite film can remedy the deficiencies of nitrile and silicon-fluorine substances during forming a film and reduce the accumulation of side products during cycles, thereby improving the cycle performance.

In some embodiments, the electrolytic solution optionally further includes a lithium salt additive, and the lithium salt additive includes at least one of the following lithium salts: lithium bistrifluoromethanesulfonimide, lithium bis(fluorosulfonyl)imide, lithium bisoxalatoborate, lithium tetrafluorooxalatophosphate, lithium difluorooxalatoborate or lithium difluorophosphate.

In some embodiments, based on the total weight of the electrolytic solution, the weight percentage of the lithium salt additive is about 0.01 wt % to about 10 wt %. In some embodiments, based on the total weight of the electrolytic solution, the weight percentage of the lithium salt additive is about 0.1 wt % to about 5 wt %. In some embodiments, based on the total weight of the electrolytic solution, the weight percentage of the lithium salt additive is about 1 wt %, about 2 wt %, about 3 wt %, about 4 wt %, about 5 wt %, about 6 wt %, about 7 wt %, about 8 wt % or about 9 wt %.

The combined use of the lithium salt additive and the lithium hexafluorophosphate can enhance the stability of the lithium hexafluorophosphate. Moreover, the lithium salt additive contains a functional group and therefore can work together with the compound containing a —CN functional group and the compound containing a silicon functional group, to participate in and form a functional organic composite film so as to reduce side reactions between the active material and the electrolytic solution and improve the stability of the electrolytic solution under high temperature, thereby improving the high-temperature cycle performance of the battery.

In some embodiments, the electrolytic solution optionally further includes a cesium salt additive, and the cesium salt additive includes cesium hexafluorophosphate.

In some embodiments, based on the total weight of the electrolytic solution, the weight percentage of the cesium salt additive is about 0.01 wt % to about 10 wt %. In some embodiments, based on the total weight of the electrolytic solution, the weight percentage of the cesium salt additive is about 0.1 wt % to about 5 wt %. In some embodiments, based on the total weight of the electrolytic solution, the weight percentage of the cesium salt additive is about 1 wt %, about 2 wt %, about 3 wt %, about 4 wt %, about 5 wt %, about 6 wt %, about 7 wt %, about 8 wt % or about 9 wt %.

In some embodiments, the electrolytic solution further includes a dinitrile compound. The dinitrile compound has small steric hindrance, and therefore can overcome film-forming defects of polynitrile substances, thereby enhancing the interface protection for the cathode material.

In some embodiments, the dinitrile compound includes, but is not limited to, butanedinitrile, pentanedinitrile, hexanedinitrile, 1,5-dicyanopentane, 1,6-dicyanohexane, 1,7-dicyanoheptane, 1,8-dicyanooctane, 1,9-dicyanononane, 1,10-dicyanodecane, 1,12-dicyanododecane, tetramethylbutanedinitrile, 2-methylpentanedinitrile, 2,4-dimethylpentanedinitrile, 2,2,4,4-tetramethylpentanedinitrile, 1,4-dicyanopentane, 1,4-dicyanopentane, 2,5-dimethyl-2,5-hexanedicarbonitrile, 2,6-dicyanoheptane, 2,7-dicyanooctane, 2,8-dicyanononane, 1,6-dicyanodecane, 1,2-dicyanobenzene, 1,3-dicyanobenzene, 1,4-dicyanobenzene, 3,5-dioxa-pimelodinitrile, 1,4-bis(cyanoethoxy)butane, ethyleneglycoldi(2-cyanoethyl)ether, diethyleneglycoldi(2-cyanoethyl)ether, triethyleneglycoldi(2-cyanoethyl)ether, tetraethyleneglycoldi(2-cyanoethyl)ether, 3,6,9,12,15,18-hexaoxaeicosanoicdinitrile, 1,3-bis(2-cyanoethoxy)propane, 1,4-bis(2-cyanoethoxy)butane, 1,5-bis(2-cyanoethoxy)pentane and ethyleneglycoldi(4-cyanobutyl)ether, 1,4-dicyano-2-butene, 1,4-dicyano-2-methyl-2-butene, 1,4-dicyano-2-ethyl-2-butene, 1,4-dicyano-2,3-dimethyl-2-butene, 1,4-dicyano-2,3-diethyl-2-butene, 1,6-dicyano-3-hexene, 1,6-dicyano-2-methyl-3-hexene, and 1,6-dicyano-2-methyl-5-methyl-3-hexene.

In some embodiments, based on the total weight of the electrolytic solution, the weight percentage of the dinitrile compound is about 0.1 wt % to about 15 wt %. In some embodiments, based on the total weight of the electrolytic solution, the weight percentage of the dinitrile compound is not less than about 0.1 wt %. In some embodiments, based on the total weight of the electrolytic solution, the weight percentage of the dinitrile compound is not less than about 0.5 wt %. In some embodiments, based on the total weight of the electrolytic solution, the weight percentage of the dinitrile compound is not less than about 2 wt %. In some embodiments, based on the total weight of the electrolytic solution, the weight percentage of the dinitrile compound is not less than about 4 wt %. In some embodiments, based on the total weight of the electrolytic solution, the weight percentage of the dinitrile compound is not greater than about 15 wt %. In some embodiments, based on the total weight of the electrolytic solution, the weight percentage of the dinitrile compound is not greater than about 10 wt %. In some embodiments, based on the total weight of the electrolytic solution, the weight percentage of the dinitrile compound is not greater than about 8 wt %.

In some embodiments, the electrolytic solution further includes a cyclic ether. The cyclic ether can form films on the cathode and anode at the same time, thereby reducing reactions between the electrolytic solution and the active material.

In some embodiments, the cyclic ether includes, but is not limited to, tetrahydrofuran, 2-methyltetrahydrofuran, 1,3-dioxolan, 2-methyl1,3-dioxolan, 4-methyl-1,3-dioxolan, 1,3-dioxane, 1,4-dioxane, and dimethoxypropane.

In some embodiments, based on the total weight of the electrolytic solution, the weight percentage of the cyclic ether is about 0.1 wt % to 10 wt %. In some embodiments, based on the total weight of the electrolytic solution, the weight percentage of the cyclic ether is not less than about 0.1 wt %. In some embodiments, based on the total weight of the electrolytic solution, the weight percentage of the cyclic ether is not less than about 0.5 wt %. In some embodiments, based on the total weight of the electrolytic solution, the weight percentage of the cyclic ether is not greater than about 2 wt %. In some embodiments, based on the total weight of the electrolytic solution, the weight percentage of the cyclic ether is not greater than about 5 wt %.

In some embodiments, the electrolytic solution further includes a chain ether. In some embodiments, the chain ether includes, but is not limited to, dimethoxymethane, 1,1-dimethoxyethane, 1,2-dimethoxyethane, diethoxymethane, 1,1-diethoxyethane, 1,2-diethoxyethane, ethoxymethoxymethane, 1,1-ethoxymethoxyethane, and 1,2-ethoxymethoxyethane.

In some embodiments, based on the total weight of the electrolytic solution, the weight percentage of the chain ether is about 0.1 wt % to 10 wt %. In some embodiments, based on the total weight of the electrolytic solution, the weight percentage of the chain ether is not less than about 0.5 wt %. In some embodiments, based on the total weight of the electrolytic solution, the weight percentage of the chain ether is not less than about 2 wt %. In some embodiments, based on the total weight of the electrolytic solution, the weight percentage of the chain ether is not less than about 3 wt %. In some embodiments, based on the total weight of the electrolytic solution, the weight percentage of the chain ether is not greater than about 10 wt %. In some embodiments, based on the total weight of the electrolytic solution, the weight percentage of the chain ether is not greater than about 5 wt %.

In some embodiments, the electrolytic solution further includes a phosphorus-containing organic solvent. The phosphorus-containing organic solvent can enhance the safety performance of the electrolytic solution. In some embodiments, the phosphorus-containing organic solvent includes, but is not limited to, trimethylphosphate, triethylphosphate, dimethylethylphosphate, methyldiethylphosphate, ethylidenemethylphosphate, ethylideneethylphosphate, triphenylphosphate, trimethylphosphite, triethylphosphite, triphenylphosphite, tri(2,2,2-trifluoroethyl)phosphate, and tri(2,2,3,3,3-pentafluoropropyl)phosphate.

In some embodiments, based on the total weight of the electrolytic solution, the weight percentage of the phosphorus-containing organic solvent is about 0.1 wt % to 10 wt %. In some embodiments, based on the total weight of the electrolytic solution, the weight percentage of the phosphorus-containing organic solvent is not less than about 0.1 wt %. In some embodiments, based on the total weight of the electrolytic solution, the weight percentage of the phosphorus-containing organic solvent is not less than about 0.5 wt %. In some embodiments, based on the total weight of the electrolytic solution, the weight percentage of the phosphorus-containing organic solvent is not greater than about 2 wt %. In some embodiments, based on the total weight of the electrolytic solution, the weight percentage of the phosphorus-containing organic solvent is not greater than about 3 wt %. In some embodiments, based on the total weight of the electrolytic solution, the weight percentage of the phosphorus-containing organic solvent is not greater than about 5 wt %.

In some embodiments, the electrolytic solution further includes an aromatic fluorine-containing solvent. The aromatic fluorine-containing solvent can form a film rapidly to protect the active material, and the fluorine-containing substance can improve the infiltration performance of the electrolytic solution for the active material. In some embodiments, the aromatic fluorine-containing solvent includes, but is not limited to, fluorobenzene, difluorobenzene, trifluorobenzene, tetrafluorobenzene, pentafluorobenzene, hexafluorobenzene, trifluoromethylbenzene.

In some embodiments, based on the total weight of the electrolytic solution, the weight percentage of the aromatic fluorine-containing solvent is about 0.1 wt % to 10 wt %. In some embodiments, based on the total weight of the electrolytic solution, the weight percentage of the aromatic fluorine-containing solvent is not less than about 0.5 wt %. In some embodiments, based on the total weight of the electrolytic solution, the weight percentage of the aromatic fluorine-containing solvent is not less than about 2 wt %. In some embodiments, based on the total weight of the electrolytic solution, the weight percentage of the aromatic fluorine-containing solvent is not greater than about 4 wt %. In some embodiments, based on the total weight of the electrolytic solution, the weight percentage of the aromatic fluorine-containing solvent is not greater than about 8 wt %.

II. Electrolyte

An electrolyte used in the electrolyte in the embodiments of the present application may be an electrolyte known in the prior art, wherein the electrolyte includes, but is not limited to, an inorganic lithium salt, such as $LiClO_4$, $LiAsF_6$, $LiPF_6$, $LiBF_4$, $LiSbF_6$, $LiSO_3F$, $LiN(FSO_2)_2$, and the like; a fluorine-containing organic lithium salt, such as $LiCF_3SO_3$, $LiN(FSO_2)(CF_3SO_2)$, $LiN(CF_3SO_2)_2$, $LiN(C_2F_5SO_2)_2$, lithium cyclic 1,3-hexafluoropropanedisulfonimide, lithium cyclic 1,2-tetrafluorethanedisulfonimide, $LiN(CF_3SO_2)(C_4F_9SO_2)$, $LiC(CF_3SO_2)_3$, $LiPF_4(CF_3)_2$, $LiPF_4(C_2F_5)_2$, $LiPF_4(CF_3SO_2)_2$, $LiPF_4(C_2F_9SO_2)_2$, $LiBF_2(CF_3)_2$, $LiBF_2(C_2F_5)_2$, $LiBF_2(CF_3SO_2)_2$, and $LiBF_2(C_2F_5SO_2)_2$; a lithium salt containing a dicarboxylic complex, such as lithium bis(oxalato)borate, lithium difluorooxalatoborate, lithium tri (oxalato)phosphate, lithium difluorobis(oxalato)phosphate, and lithium tetrafluoro(oxalato)phosphate. In addition, the foregoing electrolyte may use one of the aforementioned substances, or use two or more of the aforementioned substances. For example, in some embodiments, the electrolyte includes a combination of $LiPF_6$ and $LiBF_4$. In some embodiments, the electrolyte includes a combination of an inorganic lithium salt, such as $LiPF_6$ or $LiBF_4$, and a fluorine-containing organic lithium salt such as $LiCF_3SO_3$, $LiN(CF_3SO_2)_2$, or $LiN(C_2F_5SO_2)_2$. In some embodiments, the concentration of the electrolyte is in a range from about 0.8 to about 3 mol/L, for example, in a range from about 0.8 to about 2.5 mol/L, in a range from about 0.8 to about 2 mol/L, in a range from about 1 to about 2 mol/L, and for another example, about 1 mol/L, about 1.15 mol/L, about 1.2 mol/L, about 1.5 mol/L, about 2 mol/L, or about 2.5 mol/L.

III. Electrochemical Device

The electrochemical device of the present application includes any device in which an electrochemical reaction occurs. Specific examples of the electrochemical device include all types of primary batteries, secondary batteries, fuel batteries, solar batteries or capacitors. In particular, the electrochemical device is lithium secondary battery, including a lithium metal secondary battery, a lithium ion secondary battery, a lithium polymer secondary battery, or a lithium ion polymer secondary battery. In some embodiments, the electrochemical device is an electrochemical device with a cathode having a cathode active material capable of absorbing and releasing metal ions and a anode having a anode active material capable of absorbing and releasing metal ions, and includes any of the foregoing electrolytic solutions in the present application.

1. Electrolytic Solution

The electrolytic solution used in the electrochemical device of the present application is any of the foregoing electrolytic solutions in the present application. In addition, the electrolytic solution used in the electrochemical device of the present application may further include other electrolytic solutions without departing from the scope of the subject of the present application.

2. Anode

The anode material used in the electrochemical device of the present application, and the construction and manufacturing method thereof may include any of the techniques disclosed in the prior art. In some embodiments, the anode may be the one described in U.S. Pat. No. 9,812,739B, which is incorporated herein by reference in its entirety.

In some embodiments, the anode includes a current collector and an anode active material layer located on the current collector. The anode active material includes a material that reversibly intercalates and de-intercalates lithium ions. In some embodiments, the material that reversibly intercalates and de-intercalates lithium ions includes a carbon material. In some embodiments, the carbon material may be any carbon-based anode active material generally used in a lithium ion rechargeable battery. In some embodiments, the carbon material includes, but is not limited to, crystalline carbon, non-crystalline carbon, or a mixture thereof. The crystalline carbon may be amorphous, flake-like, strip-like, spherical, or fibrous natural graphite or artificial graphite. The non-crystalline carbon may be soft carbon, hard carbon, mesophase pitch carbide, calcined coke, and the like.

In some embodiments, the anode active material layer includes an anode active material. In some embodiments, the anode active material includes, but is not limited to, lithium metal, structured lithium metal, natural graphite, artificial graphite, mesocarbon microbeads (MCMB), hard carbon, soft carbon, silicon, a silicon-carbon complex, a Li—Sn alloy, a Li—Sn—O alloy, Sn, SnO, $SnO_2$, lithiated $TiO_2$—$Li_4Ti_5O_{12}$ with a spinel structure, a Li—Al alloy, or any combination thereof.

When the anode includes a silicon carbide, based on the total weight of the anode active material, a ratio of silicon to carbon is about 1:10 to about 10:1, and a median diameter Dv50 of the silicon carbide compound is about 0.1 μm to about 100 μm. When the anode includes an alloy material, the anode active material layer can be formed by means of evaporation, sputtering, plating, and the like. When the anode includes lithium metal, for example, the anode active material layer is formed by using a spherical twisted conductive skeleton and metal particles dispersed in the conductive skeleton. In some embodiments, the spherical twisted conductive skeleton may have a porosity of about 5% to about 85%. In some embodiments, a protective layer may further be disposed on the anode active material layer made of lithium metal.

In some embodiments, the anode active material layer may include a binder, and optionally a conductive material. The binder increases the binding of the anode active material particles to each other and the binding of the anode active material to the current collector. In some embodiments, the binder includes, but is not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidenefluoride), polyethylene, polypropylene, styrene butadiene rubber, acrylated styrene butadiene rubber, epoxy resins, Nylon and the like.

In some embodiments, the conductive material includes, but is not limited to, a carbon-based material, a metal-based material, a conductive polymer, or a mixture thereof. In some embodiments, the carbon-based material is selected from natural graphite, artificial graphite, carbon black, acetylene black, Ketjen black, carbon fiber, or any combination thereof. In some embodiments, the metal-based material is selected from metal powders, metal fibers, copper, nickel, aluminum, and silver. In some embodiments, the conductive polymer is a polyphenylene derivative.

In some embodiments, the current collector includes, but is not limited to, copper foil, nickel foil, stainless steel foil, titanium foil, foamed nickel, foamed copper, polymeric substrates coated with a conductive metal, and any combination thereof.

The anode can be prepared by using a preparation method well known in the art. For example, the anode may be obtained by mixing an active material, a conductive material and a binder in a solvent to prepare an active material composition, and coating the active material composition on a current collector. In some embodiments, the solvent may include, but is not limited to, water.

3. Cathode

The cathode material used in the electrochemical device of the present application can be prepared by using materials, construction and manufacturing methods well known in the art. In some embodiments, the cathode of the present application can be prepared by using the technique described in U.S. Pat. No. 9,812,739B, which is incorporated herein by reference in its entirety.

In some embodiments, the cathode includes a current collector and a cathode active material layer on the current collector. The cathode active material includes at least one lithiated intercalation compound that reversibly intercalates and de-intercalates lithium ions. In some embodiments, the cathode active material includes a composite oxide. In some embodiments, the composite oxide contains lithium and at least one element selected from the group consisting of cobalt, manganese, and nickel.

In some embodiments, the cathode active material is selected from lithium cobaltate, lithium nickel cobalt manganese oxide, lithium nickel cobalt aluminate, lithium manganate, lithium iron manganese phosphate, lithium iron vanadium phosphate, oxylithium vanadium phosphate, lithium ion phosphate, lithium titanate, a lithium-rich manganese-based material or any combination thereof.

In some embodiments, lithium cobaltate has chemical formula 1:

$$Li_xCO_aM1_bO_{2-c} \quad \text{Chemical formula 1;}$$

wherein M1 is at least one selected from the group consisting of nickel (Ni), manganese (Mn), magnesium (Mg), aluminum (Al), boron (B), titanium (Ti), vanadium (V), chromium (Cr), iron (Fe), copper (Cu), zinc (Zn), molybdic (Mo), tin (Sn), calcium (Ca), strontium (Sr), tungsten (W), yttrium (Y), lanthanum (La), zirconium (Zr), and silicon (Si); and values of x, a, b and c fall in the following ranges respectively: $0.8 \leq x \leq 1.2$, $0.8 \leq a \leq 1$, $0 \leq b \leq 0.2$, and $-0.1 \leq c \leq 0.2$.

In some embodiments, lithium nickel cobalt manganese oxide or lithium nickel cobalt aluminate has chemical formula 2:

$$Li_yNi_dM2_eO_{2-f} \quad \text{Chemical formula 2;}$$

wherein M2 is at least one selected from the group consisting of cobalt (Co), manganese (Mn), magnesium (Mg), aluminum (Al), boron (B), titanium (Ti), vanadium (V), chromium (Cr), iron (Fe), copper (Cu), zinc (Zn), molybdic (Mo), tin (Sn), calcium (Ca), strontium (Sr), tungsten (W), zirconium (Zr), and silicon (Si); and values of y, d, e and f fall in the following ranges respectively: $0.8 \leq y \leq 1.2$, $0.3 \leq d \leq 0.98$, $0.02 \leq e \leq 0.7$, and $-0.1 \leq f \leq 0.2$.

In some embodiments, lithium manganate has chemical formula 3:

$$Li_zMn_{2-g}M3_gO_{4-h} \quad \text{Chemical formula 3;}$$

wherein M3 is at least one selected from the group consisting of cobalt (Co), nickel (Ni), magnesium (Mg), aluminum (Al), boron (B), titanium (Ti), vanadium (V), chromium (Cr), iron (Fe), copper (Cu), zinc (Zn), molybdic (Mo), tin (Sn), calcium (Ca), strontium (Sr), and tungsten (W); and values of z, g and h fall in the following ranges respectively: $0.8 \leq z \leq 1.2$, $0 \leq g < 1.0$, and $-0.2 \leq h \leq 0.2$.

In some embodiments, the cathode active material may have a coating on its surface or may be mixed with another compound having a coating. The coating may include at least one coating element compound selected from the group consisting of an oxide of a coating element, a hydroxide of a coating element, an oxyhydroxide of a coating element, an oxycarbonate of a coating element, and a hydroxycarbonate of a coating element. The compound used for the coating may be amorphous or crystalline.

In some embodiments, the coating element contained in the coating may include Mg, Al, Co, K, Na, Ca, Si, Ti, V, Sn, Ge, Ga, B, As, Zr or any combination thereof. The coating may be applied by using any method as long as the method does not adversely affect the performance of the cathode active material. For example, the method may include any coating method known in the art, such as spraying, dipping, and the like.

The cathode active material layer further includes a binder, and optionally a conductive material. The binder increases the binding of the cathode active material particles to each other and the binding of the cathode active material to the current collector.

In some embodiments, the binder includes, but is not limited to, polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidenefluoride), polyethylene, polypropylene, styrene butadiene rubber, acrylated styrene butadiene rubber, epoxy resins, Nylon and the like.

In some embodiments, the conductive material includes, but is not limited to, a carbon-based material, a metal-based material, a conductive polymer, and a mixture thereof. In some embodiments, the carbon-based material is selected from natural graphite, artificial graphite, carbon black, acetylene black, Ketjen black, carbon fiber, or any combination thereof. In some embodiments, the metal-based material is selected from metal powders, metal fibers, copper, nickel, aluminum, and silver. In some embodiments, the conductive polymer is a polyphenylene derivative.

In some embodiments, the current collector may be, but is not limited to, aluminum.

The cathode can be prepared by using a preparation method well known in the art. For example, the cathode can be obtained by mixing an active material, a conductive material and a binder in a solvent to prepare an active material composition, and coating the active material composition on a current collector. In some embodiments, the solvent may include, but is not limited to, N-methylpyrrolidone or the like.

In some embodiments, the cathode is prepared by forming a cathode material with a cathode active material layer including a lithium-transition metal compound powder and a binder on a current collector.

In some embodiments, the cathode active material layer can generally be produced by dry mixing a cathode material and a binder (and a conductive material and a thickener if needed) to form flakes, and pressing the obtained flakes on a cathode current collector; or dissolving or dispersing the material in a liquid medium to form a slurry, coating the slurry on a cathode current collector, and drying. In some embodiments, the material of the cathode active material layer includes any material known in the art.

4. Separator

In some embodiments, the electrochemical device of the present application is provided with a separator between the cathode and the anode to prevent short circuit. The material and shape of the separator used in the electrochemical device of the present application are not particularly limited, and may be any of the techniques disclosed in the prior art. In some embodiments, the separator includes a polymer or an inorganic substance or the like formed of a material which is stable against the electrolytic solution of the present application.

For example, the separator may include a substrate layer and a surface treatment layer. The substrate layer is a nonwoven fabric, film, or composite film having a porous structure, and the material of the substrate layer is at least one selected from the group consisting of polyethylene, polypropylene, polyethylene terephthalate, and polyimide. Particularly, a porous polypropylene film, a porous polyethylene film, a polypropylene nonwoven fabric, a polyethylene nonwoven fabric, or a porous polypropylene-polyethylene-polypropylene composite film may be used.

At least one surface of the substrate layer is provided with a surface treatment layer, which may be a polymer layer or an inorganic layer, or a layer formed by mixing a polymer and an inorganic material.

The inorganic layer includes inorganic particles and a binder. The inorganic particles are at least one selected from the group consisting of alumina, silica, magnesia, titania, hafnium dioxide, tin oxide, cerium dioxide, nickel oxide, zinc oxide, calcium oxide, zirconia, yttria, silicon carbide, eboehmite, aluminum hydroxide, magnesium hydroxide, calcium hydroxide and barium sulfate, or a combination of more than one thereof. The binder is one selected from the group consisting of polyvinylidene fluoride, a copolymer of vinylidene fluoride-hexafluoropropylene, polyamide, polyacrylonitrile, polyacrylate ester, polyacrylic acid, a polyacrylate salt, polyvinylpyrrolidone, polyvinyl ether, polymethylmethacrylate, polytetrafluoroethylene, and polyhexafluoropropylene, or a combination of more than one thereof. The polymer layer contains a polymer, and the material of the polymer includes at least one of polyamide, polyacrylonitrile, polyacrylate ester, polyacrylic acid, a polyacrylate salt, polyvinylpyrrolidone, polyvinyl ether, polyvinylidene fluoride or poly(vinylidene fluoride-hexafluoropropylene).

IV. Application

The electrolytic solution according to the embodiments of the present application can be used for improving the rate performance, a normal-temperature storage capacity retention rate, as well as cyclic storage and high-temperature storage performance of the battery, and is suitable for use in electronic equipment containing the electrochemical device.

The use of the electrochemical device of the present application is not particularly limited, and the electrochemical device can be used in various known applications, such as notebook computers, pen-input computers, mobile computers, e-book players, portable phones, portable fax machines, portable copiers, portable printers, head-mounted stereo headphones, video recorders, LCD TVs, portable cleaners, portable CD players, Mini disc players, transceivers, electronic notebooks, calculators, memory cards, portable recorders, radios, backup power sources, motors, vehicles, motorcycles, scooters, bicycles, lighting apparatuses, toys, game consoles, clocks, electric tools, flashlights, cameras, large batteries for household use, or lithium ion capacitors.

The preparation and performance of the lithium ion battery of the present application are illustrated in the following by using a lithium ion battery as an example in combination with the specific embodiments for preparing the electrolytic solution of the present application and test methods for the electrochemical device. A person skilled in the art will understand that, the preparation method described in the present application is merely an example, and all other suitable preparation methods fall within the scope of the present application.

Although a lithium ion battery is used as an example for description, a person skilled in the art can conceive that the cathode material of the present application can be used for other suitable electrochemical devices. Such electrochemical devices include any devices in which electrochemical reactions occur. Specific examples of such electrochemical devices include all types of primary batteries, secondary batteries, fuel batteries, solar batteries or capacitors. In particular, the electrochemical device is a lithium secondary battery, including a lithium metal secondary battery, a lithium ion secondary battery, a lithium polymer secondary battery, or a lithium ion polymer secondary battery.

EXAMPLES

Hereinafter, the present application will be specifically described by way of examples and comparative examples; however, the present application is not limited to these examples as long as they do not deviate from the subject of the present application.

1. Preparation of a Lithium Ion Battery

1) Preparation of an electrolytic solution: in an argon atmosphere glove box with a water content less than 10 ppm, ethylene carbonate (EC), diethyl carbonate (DEC), and propylene carbonate (PC) were evenly mixed based on a weight ratio of about 3:4:3, and then a sufficiently dried lithium salt $LiPF_6$ was dissolved in the solvent to obtain a basic electrolytic solution, wherein the concentration of $LiPF_6$ in the basic electrolytic solution was about 1 mol/L. Substances with different contents shown in the following tables were added to the basic electrolytic solution to obtain electrolytic solutions in different examples and comparative examples. The contents of all the substances in the electrolytic solution described below were calculated based on the total weight of the electrolytic solution.

2) Preparation of a cathode: the cathode active material lithium cobalt oxide ($LiCoO_2$), the conductive agent acetylene black, and the binder polydifluoroethylene (PVDF) based on a weight ratio of about 96:2:2 were fully stirred and mixed in an appropriate amount of N-methylpyrrolidone (NMP) solvent, to form a uniform cathode slurry. The slurry was coated on the current collector Al foil of the cathode, dried, and cold-pressed to obtain a cathode.

3) Preparation of an anode: the anode active material graphite, the conductive agent acetylene black, the binder styrene butadiene rubber (SBR), and the thickener sodium carboxymethylcellulose (CMC) based on a weight ratio of about 95:2:2:1 were fully stirred and mixed in an appropriate amount of deionized water solvent, to form a uniform anode slurry. The slurry was coated on the current collector Cu foil of the anode, dried, and cold-pressed to obtain an anode.

4) Separator: a porous PE polymer film was used as a separator.

5) Preparation of a lithium ion battery: the cathode, the separator, and the anode were stacked in sequence, so that the separator was located between the cathode and the anode to play a role of insulation, then the stacked cathode, separator, and anode were wound and placed in packaging foil, and a liquid injection port was remained. The electrolytic solution was poured into the liquid injection port, and a lithium ion battery was produced after processes such as vacuum packaging, standing, formation, and shaping.

The compounds containing a —CN functional group used in the examples are shown as follows:

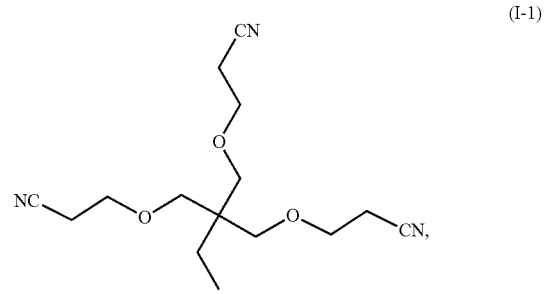

(I-1)

-continued

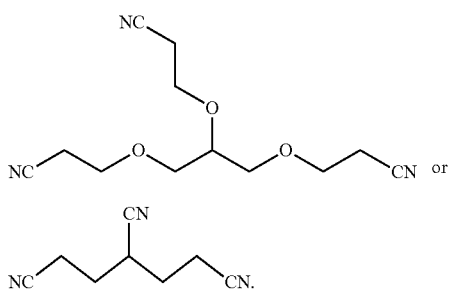
(I-2)

(I-7)

The compounds containing a silicon functional group used in the examples are shown as follows:

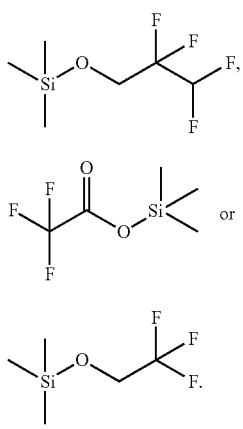
(II-1)

(II-5)

(II-6)

The compounds containing a sulfur-oxygen double bond functional group used in the examples are shown as follows:

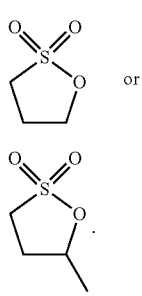
(formula III-1)

(formula III-2)

The boron-containing compounds used in the examples are shown as follows:

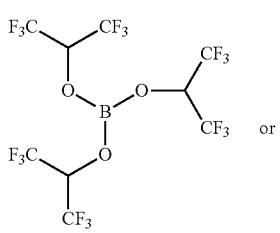
(formua IV-1)

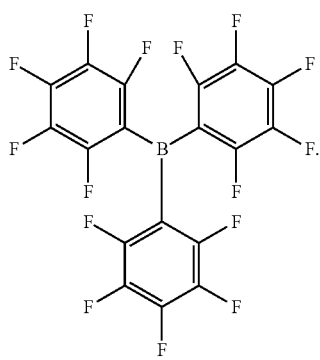
(formula IV-3)

The isocyanurate compounds used in the examples are shown as follows:

(formula V-1)

(formula V-3)

The specific lithium salt additive used in the examples was lithium difluorophosphate ($LiPO_2F_2$) or lithium difluorooxalatoborate $LiBF_2(C_2O_4)$.

A. The electrolytic solutions and lithium ion batteries in Examples 1-19 and Comparative Examples 1-5 were prepared according to the foregoing preparation method, wherein the contents of the substances in the electrolytic solutions are shown in Table 1.

TABLE 1

| No. | Compound containing a —CN functional group (wt %) | | | Compound containing a silicon functional group (wt %) | | |
|---|---|---|---|---|---|---|
| | I-1 | I-2 | I-7 | II-1 | II-5 | II-6 |
| Example 1 | — | 0.1 | — | — | 5 | — |
| Example 2 | — | 0.5 | — | — | 5 | — |
| Example 3 | — | 0.7 | — | — | 5 | — |
| Example 4 | — | 1 | — | — | 5 | — |
| Example 5 | — | 2 | — | — | 5 | — |
| Example 6 | — | 3 | — | — | 5 | — |
| Example 7 | — | 5 | — | — | 5 | — |
| Example 8 | — | 10 | — | — | 5 | — |
| Example 9 | — | 3 | — | — | 0.1 | — |
| Example 10 | — | 3 | — | — | 2 | — |
| Example 11 | — | 3 | — | — | 3 | — |
| Example 12 | — | 3 | — | — | 10 | — |
| Example 13 | — | 3 | — | — | 20 | — |
| Example 14 | — | 3 | — | — | 30 | — |
| Example 15 | 3 | — | — | 5 | — | — |
| Example 16 | 3 | — | — | — | — | 6 |
| Example 17 | — | — | 3 | 4 | — | — |
| Example 18 | — | — | 3 | — | 5 | — |

TABLE 1-continued

| | Compound containing a —CN functional group (wt %) | | | Compound containing a silicon functional group (wt %) | | |
|---|---|---|---|---|---|---|
| No. | I-1 | I-2 | I-7 | II-1 | II-5 | II-6 |
| Example 19 | — | — | 3 | — | — | 6 |
| Comparative Example 1 | — | — | — | — | — | — |
| Comparative Example 2 | — | — | — | — | 5 | — |
| Comparative Example 3 | — | 3 | — | — | — | — |
| Comparative Example 4 | — | 15 | — | — | 40 | — |
| Comparative Example 5 | — | 15 | — | — | 5 | — |

"—" represents substance not present.

The performance of the batteries in Examples 1-19 and Comparative Examples 1-5 was tested through the following battery performance test methods.

Test 1. Temperature Test:

The battery was charged to 4.4 V at 0.5 C at a temperature of 25° C., and charged to 0.05 C at the constant voltage of 4.4 V. The battery was placed in a temperature-controllable test chamber, and the following operations were performed:

a) placing the sample into a test chamber at a temperature of 75° C.±2° C., and standing for 6 hours;

b) reducing the temperature of the test chamber to −40° C.±2° C., and standing for 6 h, a temperature conversion time being 30 min±5 min;

c) increasing the temperature of the test chamber back to 75° C.±2° C., a temperature conversion time being 30 min±5 min; and d) repeating steps a) to c) for 10 times.

The battery passed the test if it did not burn, explode, or leak.

The results of the temperature test are shown in Table 2.

TABLE 2

| No. | Temperature test |
|---|---|
| Example 1 | 4/5 pass |
| Example 2 | 4/5 pass |
| Example 3 | 5/5 pass |
| Example 4 | 5/5 pass |
| Example 5 | 5/5 pass |
| Example 6 | 5/5 pass |
| Example 7 | 5/5 pass |
| Example 8 | 5/5 pass |
| Example 9 | 5/5 pass |
| Example 10 | 5/5 pass |
| Example 11 | 5/5 pass |
| Example 12 | 5/5 pass |
| Example 13 | 5/5 pass |
| Example 14 | 5/5 pass |
| Example 15 | 5/5 pass |
| Example 16 | 5/5 pass |
| Example 17 | 5/5 pass |
| Example 18 | 5/5 pass |
| Example 19 | 5/5 pass |
| Comparative Example 1 | 0/5 pass |
| Comparative Example 2 | 1/5 pass |
| Comparative Example 3 | 1/5 pass |
| Comparative Example 4 | 2/5 pass |
| Comparative Example 5 | 2/5 pass |

It can be seen from the test results of Examples 1-14 and Comparative Examples 1-3 that, after the compound containing a —CN functional group and the compound containing a silicon functional group were added, the passing rate of the temperature test was improved, which may be because that the addition of the two compounds enhanced the oxidation resistance of the electrolytic solution.

Test 2. High-Temperature External Short Circuit Test:

The battery was charged to 4.4 V at 0.5 C at a temperature of 25° C., and charged to 0.05 C at the constant voltage of 4.4 V. The battery was placed in an environment with a temperature of 55° C.±5° C., and further allowed to stand for 30 min after the surface temperature of the battery reached 55° C.±5° C. The cathode and anode terminals of the battery were connected using a wire, and it was ensured that all external resistance was 80 mΩ±20 mΩ. Temperature changes of the battery were detected during the test (the highest temperature during the test is referred to as "a peak value"), and the test was terminated upon occurrence of one of the following two situations:

a) the temperature of the battery lowered to a value that was 20% less than a peak value; and b) a short circuit time reached 24 hours.

The battery passed the test if it did not burn or explode, and the highest temperature thereof does not exceed 150° C.

The results of the high-temperature external short circuit test are shown in Table 3.

TABLE 3

| No. | High-temperature external short circuit test |
|---|---|
| Example 1 | 4/5 pass |
| Example 2 | 4/5 pass |
| Example 3 | 5/5 pass |
| Example 4 | 5/5 pass |
| Example 5 | 5/5 pass |
| Example 6 | 5/5 pass |
| Example 7 | 5/5 pass |
| Example 8 | 5/5 pass |
| Example 9 | 5/5 pass |
| Example 10 | 5/5 pass |
| Example 11 | 5/5 pass |
| Example 12 | 5/5 pass |
| Example 13 | 5/5 pass |
| Example 14 | 5/5 pass |
| Example 15 | 5/5 pass |
| Example 16 | 5/5 pass |
| Example 17 | 5/5 pass |
| Example 18 | 5/5 pass |
| Example 19 | 5/5 pass |
| Comparative Example 1 | 0/5 pass |
| Comparative Example 2 | 1/5 pass |
| Comparative Example 3 | 1/5 pass |
| Comparative Example 4 | 2/5 pass |
| Comparative Example 5 | 3/5 pass |

It can be seen from the test results of Examples 1-14 and Comparative Examples 1 and 2 that, the addition of the compound containing a —CN functional group and the compound containing a silicon functional group can improve the passing rate of the high-temperature external short circuit test of the battery, and can improve the safety performance of the battery.

Test 3. Press Test:

The battery was charged to 4.4 V at 0.7 C at a temperature of 25° C., and charged to 0.05 C at the constant voltage of 4.4 V. Then, the battery was placed in two planes, and was pressed in a direction perpendicular to the plate direction. A pressure of 13.0 kN±0.78 kN was applied between the two plates, and the press test could be stopped once the pressure reached the maximum value(13.0 kN±0.78 kN). External short circuit of the battery was not allowed during the test.

The battery passed the test if it did not burn or explode. The results of the press test are shown in Table 4.

TABLE 4

| No. | Press test |
|---|---|
| Example 1 | 4/5 pass |
| Example 2 | 4/5 pass |
| Example 3 | 4/5 pass |
| Example 4 | 5/5 pass |
| Example 5 | 5/5 pass |
| Example 6 | 5/5 pass |
| Example 7 | 5/5 pass |
| Example 8 | 5/5 pass |
| Example 9 | 5/5 pass |
| Example 10 | 5/5 pass |
| Example 11 | 5/5 pass |
| Example 12 | 5/5 pass |
| Example 13 | 5/5 pass |
| Example 14 | 5/5 pass |
| Example 15 | 5/5 pass |
| Example 16 | 5/5 pass |
| Example 17 | 5/5 pass |
| Example 18 | 5/5 pass |
| Example 19 | 5/5 pass |
| Comparative Example 1 | 0/5 pass |
| Comparative Example 2 | 1/5 pass |
| Comparative Example 3 | 1/5 pass |
| Comparative Example 4 | 1/5 pass |
| Comparative Example 5 | 2/5 pass |

It can be seen from the test results of Examples 1-14 and Comparative Examples 1-3 that, the addition of the compound containing a —CN functional group and the compound containing a silicon functional group can improve the passing rate of the press test of the battery, and can improve the safety performance of the battery.

B. The electrolytic solutions and lithium ion batteries in Examples 20-28 were prepared according to the foregoing preparation method, wherein the contents of the substances in the electrolytic solutions are shown in Table 5.

A temperature test and a 4.4 V storage test were performed on the batteries in Example 6 and Examples 20-28, wherein the process of the 4.4 V storage test was as follows:

Test 4. 4.4 V Storage Test:

The battery was charged to 4.4 V at 0.5 C, and was charged to 0.05 C at the constant voltage of 4.4 V. The battery thickness at this time was measured, and recorded as a reference thickness, which was marked as $a_1$. Then, the battery was placed into an oven at 60° C. and stayed for 21 days at a voltage of 4.4 V at a constant temperature. The battery was taken out after 21 days, and the thickness of the battery was measured within 1 hour after the battery was taken out. The thickness of the battery at this moment was marked as $b_1$. A formula for calculating a thickness swelling rate was as follows: thickness swelling rate= $(b_1/a_1-1)*100\%$. The battery thickness was measured by using a PPG soft pack battery thickness gauge, and the measurement was carried out under a pressure of 300 g.

The test results are shown in Table 6.

TABLE 6

| No. | Temperature test | 60° C.-4.4 V 21 days thickness swelling rate |
|---|---|---|
| Example 6 | 5/5 pass | 7.50% |
| Example 20 | 5/5 pass | 7.00% |
| Example 21 | 5/5 pass | 6.80% |
| Example 22 | 5/5 pass | 6.00% |
| Example 23 | 5/5 pass | 5.20% |
| Example 24 | 5/5 pass | 5.20% |
| Example 25 | 5/5 pass | 5.21% |
| Example 26 | 5/5 pass | 6.00% |
| Example 27 | 5/5 pass | 5.20% |
| Example 28 | 5/5 pass | 5.20% |

It can be seen from the test results of Example 6 and Examples 20-28 that, the storage thickness swelling of the battery was significantly alleviated after the compound

TABLE 5

| No. | Compound containing a —CN functional group (wt %) | Compound containing a silicon functional group (wt %) | Compound containing a sulfur-oxygen double bond functional group (wt %) | |
|---|---|---|---|---|
| | I-2 | II-5 | III-1 | III-2 |
| Example 6 | 3 | 5 | — | — |
| Example 20 | 3 | 5 | 0.1 | — |
| Example 21 | 3 | 5 | 1 | — |
| Example 22 | 3 | 5 | 3 | — |
| Example 23 | 3 | 5 | 4 | — |
| Example 24 | 3 | 5 | 5 | — |
| Example 25 | 3 | 5 | 8 | — |
| Example 26 | 3 | 5 | — | 3 |
| Example 27 | 3 | 5 | — | 4 |
| Example 28 | 3 | 5 | — | 5 |

"—" represents substance not present.

containing a sulfur-oxygen double bond functional group was added to the electrolytic solution, due to the enhanced protection effect of the electrolytic solution to the cathode.

C. The electrolytic solutions and lithium ion batteries in Examples 29-36 were prepared according to the foregoing preparation method, wherein the contents of the substances in the electrolytic solutions are shown in Table 7.

TABLE 7

| No. | Compound containing a —CN functional group (wt %) | Compound containing a silicon functional group (wt %) | Boron-containing compound (wt %) | |
|---|---|---|---|---|
| | I-2 | II-5 | IV-2 | IV-3 |
| Example 6 | 3 | 5 | — | — |
| Example 29 | 3 | 5 | 0.1 | — |
| Example 30 | 3 | 5 | 0.3 | — |
| Example 31 | 3 | 5 | 0.5 | — |
| Example 32 | 3 | 5 | 1 | — |
| Example 33 | 3 | 5 | 5 | — |
| Example 34 | 3 | 5 | 10 | — |
| Example 35 | 3 | 5 | — | 0.3 |
| Example 36 | 3 | 5 | — | 0.5 |

"—" represents substance not present.

A temperature test and a direct-current resistance test were performed on the batteries in Example 6 and Examples 29-36, wherein a process of the direct-current resistance test was as follows:

Test 5. 20% SOC Direct-Current Resistance Test:

The battery was allowed to stand in a high-low temperature chamber for 2 h and was charged to 4.4 V at a current of 0.7 C. The constant voltage of 4.4 V was maintained until the current became 0.025 C. After a 10-min rest, the battery was discharged to 3.4 V at a current of 0.1 C, and an actual discharge capacity $C_1$ of the battery was recorded. Then, with $C_1$ as a reference, the battery was charged to 4.4 V at a constant current of $0.7*C_1$. The constant voltage of 4.4 V was maintained until the current became $0.025\ C_1$. After a 10-min rest, the battery was discharged for 8 h at a current of $0.1\ C_1$, and a voltage (V1) at this moment was recorded. Next, the battery was discharged for 1 s at a current of $1C_1$, and a voltage (V2) after discharge for 1s was recorded. A formula for calculation 20% SOC direct-current resistance was as follows:

Direct-current resistance=$(V1-V2)/1C_1$

The test results are shown in Table 8.

TABLE 8

| No. | Temperature test | 20% SOC direct-current resistance/mΩ |
|---|---|---|
| Example 6 | 5/5 pass | 60 |
| Example 29 | 5/5 pass | 55 |
| Example 30 | 5/5 pass | 54 |
| Example 31 | 5/5 pass | 52 |
| Example 32 | 5/5 pass | 53 |
| Example 33 | 5/5 pass | 53 |
| Example 34 | 5/5 pass | 53 |
| Example 35 | 5/5 pass | 54 |
| Example 36 | 5/5 pass | 52 |

It can be seen from the test results of Example 6 and Examples 29-36 that, the addition of the boron-containing compound to the electrolytic solution can improve the direct-current resistance of the battery.

D. The electrolytic solutions and lithium ion batteries in Examples 37-40 were prepared according to the foregoing preparation method, wherein the contents of the substances in the electrolytic solutions are shown in Table 9.

TABLE 9

| No. | Compound containing a —CN functional group (wt %) | Compound containing a silicon functional group (wt %) | Compound containing a sulfur-oxygen double bond functional group (wt %) | Boron-containing compound (wt %) |
|---|---|---|---|---|
| | I-2 | II-5 | III-1 | IV-2 |
| Example 23 | 3 | 5 | 4 | — |
| Example 37 | 3 | 5 | 4 | 0.3 |
| Example 38 | 3 | 5 | 4 | 0.5 |
| Example 39 | 3 | 5 | 4 | 1 |
| Example 40 | 3 | 5 | 4 | 5 |

"—" represents substance not present.

A temperature test, a 4.4 V storage test, and a 20% SOC direct-current resistance test were performed on the batteries in Example 23 and Examples 37-40. The test results are shown in Table 10.

TABLE 10

| No. | Temperature test | 60° C.-4.4 V 21 days thickness swelling rate | 20% SOC direct-current resistance/mΩ |
|---|---|---|---|
| Example 23 | 5/5 pass | 5.20% | 62 |
| Example 37 | 5/5 pass | 5.32% | 55 |
| Example 38 | 5/5 pass | 5.40% | 53 |
| Example 39 | 5/5 pass | 6.00% | 54 |
| Example 40 | 5/5 pass | 6.50% | 54 |

It can be seen from the test results of Example 23 and Examples 37-40 that, the direct-current resistance of the battery was improved.

E. The electrolytic solutions and lithium ion batteries in Examples 41-50 were prepared according to the foregoing preparation method, wherein the contents of the substances in the electrolytic solutions are shown in Table 11.

TABLE 11

| No. | Compound containing a —CN functional group (wt %) I-2 | Compound containing a silicon functional group (wt %) II-5 | Isocyanurate compound (wt %) V-1 | V-3 |
|---|---|---|---|---|
| Example 6 | 3 | 5 | — | — |
| Example 41 | 3 | 5 | 0.1 | — |
| Example 42 | 3 | 5 | 0.5 | — |
| Example 43 | 3 | 5 | 1 | — |
| Example 44 | 3 | 5 | 2 | — |
| Example 45 | 3 | 5 | 3 | — |
| Example 46 | 3 | 5 | 5 | — |
| Example 47 | 3 | 5 | 10 | — |
| Example 48 | 3 | 5 | — | 0.5 |
| Example 49 | 3 | 5 | — | 2 |
| Example 50 | 3 | 5 | — | 3 |

"—" represents substance not present.

A temperature test and a 25° C. cycle test were performed to test the performance of the batteries in Example 6 and Examples 41-50, wherein a process of the 25° C. cycle test was as follows:

Test 6, 25° C. Cycle Test:

The battery was charged to 4.4 V at 0.7 C at a temperature of 25° C., and then charged to 0.05 C under the constant voltage of 4.4 V. Then the battery was discharged to 3.0 V at a current of 1 C. The above is one cycle, and the discharged capacity was recorded. The process of charging at 0.7 C and discharging at 1 C was cycled 800 times. The discharged capacity in each cycle was recorded. The capacity retention rate of the $800^{th}$ cycle was calculated by using the battery capacity discharged in the first cycle as a reference.

The test results are shown in Table 12.

TABLE 12

| No. | Temperature test | 25° C.-800-cycles capacity retention rate |
|---|---|---|
| Example 6 | 5/5 pass | 83.1% |
| Example 41 | 5/5 pass | 83.4% |
| Example 42 | 5/5 pass | 85.2% |
| Example 43 | 5/5 pass | 86.2% |
| Example 44 | 5/5 pass | 86.6% |
| Example 45 | 5/5 pass | 86.5% |
| Example 46 | 5/5 pass | 86.4% |
| Example 47 | 5/5 pass | 86.3% |
| Example 48 | 5/5 pass | 85.3% |
| Example 49 | 5/5 pass | 86.6% |
| Example 50 | 5/5 pass | 86.4% |

It can be seen from the test results of Example 6 and Examples 41-50 that, after the isocyanurate compound was added to the electrolytic solution, the 25° C. cycle performance of the battery was significantly improved.

F. The electrolytic solutions and lithium ion batteries in Examples 51-52 were prepared according to the foregoing preparation method, wherein the contents of the substances in the electrolytic solutions are shown in Table 13.

TABLE 13

| No. | Compound containing a —CN functional group (wt %) I-2 | Compound containing a silicon functional group (wt %) II-5 | Compound containing a sulfur-oxygen double bond functional group (wt %) III-1 | Isocyanurate compound (wt %) V-1 |
|---|---|---|---|---|
| Example 23 | 3 | 5 | 4 | — |
| Example 51 | 3 | 5 | 4 | 0.5 |
| Example 52 | 3 | 5 | 4 | 2 |

"—" represents substance not present.

A temperature test, a 4.4 V storage test and a 25° C. cycle test were performed to test the performance of the batteries in Example 23 and Examples 51 and 52.

The test results are shown in Table 14.

TABLE 14

| No. | Temperature test | 60° C.-4.4 V 21 days thickness swelling rate | 25° C.-800-cycles capacity retention rate |
| --- | --- | --- | --- |
| Example 23 | 5/5 pass | 5.20% | 83.2% |
| Example 51 | 5/5 pass | 5.18% | 85.3% |
| Example 52 | 5/5 pass | 5.15% | 86.7% |

It can be seen from the test results of Example 23 and Examples 51 and 52 that, desirable improvement effect on the 25° C. cycle performance of the battery can still be remained when the isocyanurate compound and the compound containing a sulfur-oxygen double bond functional group were used in combination in the electrolytic solution.

G. The electrolytic solutions and lithium ion batteries in Examples 53 and 54 were prepared according to the foregoing preparation method, wherein the contents of the substances in the electrolytic solutions are shown in Table 15.

TABLE 15

| No. | Compound containing a -CN functional group (wt %) I-2 | Compound containing a silicon functional group (wt %) II-5 | Boron-containing compound (wt %) IV-2 | Isocyanurate compound (wt %) V-1 |
| --- | --- | --- | --- | --- |
| Example 31 | 3 | 5 | 0.5 | — |
| Example 53 | 3 | 5 | 0.5 | 0.5 |
| Example 54 | 3 | 5 | 0.5 | 2 |

"—" represents substance not present.

A temperature test, a 20% SOC impedance test and a 25° C. cycle test were performed on the batteries in Example 31 and Examples 53 and 54.

The test results are shown in Table 16.

TABLE 16

| No. | Temperature test | 20% SOC impedance/ mΩ | 25° C.-800-cycles capacity retention rate |
| --- | --- | --- | --- |
| Example 31 | 5/5 pass | 52 | 83.1% |
| Example 53 | 5/5 pass | 53 | 85.2% |
| Example 54 | 5/5 pass | 58 | 86.6% |

It can be seen from the test results of Example 31 and Examples 53 and 54 that, the 25° C. cycle performance of the battery can be improved when the isocyanurate compound and the boron-containing compound were used in combination in the electrolytic solution.

H. The electrolytic solutions and lithium ion batteries in Examples 55 and 56 were prepared according to the foregoing preparation method, wherein the contents of the substances in the electrolytic solutions were shown in Table 17.

TABLE 17

| No. | Compound containing a —CN functional group (wt %) I-2 | Compound containing a silicon functional group (wt %) II-5 | Compound containing a sulfur-oxygen double bond functional group (wt %) III-1 | Boron-containing compound (wt %) IV-2 | Isocyanurate compound (wt %) V-1 |
| --- | --- | --- | --- | --- | --- |
| Example 38 | 3 | 5 | 4 | 0.5 | — |
| Example 55 | 3 | 5 | 4 | 0.5 | 0.5 |
| Example 56 | 3 | 5 | 4 | 0.5 | 2 |

"—" represents substance not present.

A temperature test, a 4.4 V storage test, a 20% SOC impedance test and a 25° C. cycle test were performed on the batteries in Example 38 and Examples 55 and 56.

The test results are shown in Table 18.

TABLE 18

| No. | Temperature test | 60° C.-4.4 V 21 days thickness swelling rate | 20% SOC impedance/ mΩ | 25° C.-800-cycles capacity retention rate |
| --- | --- | --- | --- | --- |
| Example 38 | 5/5 pass | 5.40% | 53 | 83.2% |
| Example 55 | 5/5 pass | 5.35% | 55 | 85.2% |
| Example 56 | 5/5 pass | 5.30% | 58 | 86.7% |

It can be seen from the test results of Example 38 and Examples 55 and 56 that, the 25° C. cycle performance of the battery can be improved when the isocyanurate compound, the compound containing a sulfur-oxygen double bond functional group, and the boron-containing compound were used in combination in the electrolytic solution.

I. Electrolytic solutions and lithium ion batteries in Examples 57-66 were prepared according to the foregoing preparation method, wherein the contents of substances in the electrolytic solutions were shown in Table 19.

TABLE 19

| No. | Compound containing a —CN functional group (wt %) I-2 | Compound containing a silicon functional group (wt %) II-5 | Lithium salt additive (wt %) LiPO$_2$F$_2$ | LiBF$_2$(C$_2$O$_4$) |
|---|---|---|---|---|
| Example 6 | 3 | 5 | — | — |
| Example 57 | 3 | 5 | 0.1 | — |
| Example 58 | 3 | 5 | 0.3 | — |
| Example 59 | 3 | 5 | 0.5 | — |
| Example 60 | 3 | 5 | 1 | — |
| Example 61 | 3 | 5 | 3 | — |
| Example 62 | 3 | 5 | 5 | — |
| Example 63 | 3 | 5 | 10 | — |
| Example 64 | 3 | 5 | — | 0.3 |
| Example 65 | 3 | 5 | — | 0.5 |
| Example 66 | 3 | 5 | — | 1 |

"—" represents substance not present.

A temperature test and a 45° C. cycle test were performed on the batteries in Example 6 and Examples 57-66, wherein a process of the 45° C. cycle test was as follows:

Test 7. 45° C. Cycle Test:

The battery was charged to 4.4 V at 0.7 C at a temperature of 45° C., and then charged to 0.05 C under the constant voltage of 4.4 V. Then the battery was discharged to 3.0 V at a current of 1 C. The above was the first cycle, and the discharged capacity was recorded. The process of charging at 0.7 C and discharging at 1 C was cycled 500 times. The battery capacity discharged in each cycle was recorded. The capacity retention rate was calculated by using the battery capacity discharged in the first cycle as a reference.

The test results are shown in Table 20:

TABLE 20

| No. | Temperature test | 45° C.-500-cycles capacity retention rate |
|---|---|---|
| Example 6 | 5/5 pass | 85.4% |
| Example 57 | 5/5 pass | 86.2% |
| Example 58 | 5/5 pass | 87.2% |
| Example 59 | 5/5 pass | 88.1% |
| Example 60 | 5/5 pass | 88.6% |
| Example 61 | 5/5 pass | 88.4% |
| Example 62 | 5/5 pass | 88.3% |
| Example 63 | 5/5 pass | 88.4% |
| Example 64 | 5/5 pass | 87.3% |
| Example 65 | 5/5 pass | 88.0% |
| Example 66 | 5/5 pass | 88.5% |

It can be seen from the test results of Example 6 and Examples 57-66 that, the addition of the lithium salt additive to the electrolytic solution can improve the high-temperature cycle capacity retention rate of the battery, due to the enhanced protection effect of the electrolytic solution to the active material of the battery.

J. The electrolytic solutions and lithium ion batteries in Examples 67 and 68 were prepared according to the foregoing preparation method, wherein the contents of substances in the electrolytic solutions are shown in Table 21.

TABLE 21

| No. | Compound containing a —CN functional group (wt %) I-2 | Compound containing a silicon functional group (wt %) II-5 | Compound containing a sulfur-oxygen double bond functional group (wt %) III-1 | Lithium salt additive (wt %) LiPO$_2$F$_2$ |
|---|---|---|---|---|
| Example 23 | 3 | 5 | 4 | — |
| Example 67 | 3 | 5 | 4 | 0.3 |
| Example 68 | 3 | 5 | 4 | 0.5 |

"—" represents substance not present.

A temperature test, a 4.4 V storage test and a 45° C. cycle test were performed to test the performance of the batteries in Example 23 and Examples 67 and 68.

The test results are shown in Table 22.

TABLE 22

| No. | Temperature test | 60° C.-4.4 V 21 days thickness swelling rate | 45° C.-500-cycles capacity retention rate |
|---|---|---|---|
| Example 23 | 5/5 pass | 5.20% | 85.6% |
| Example 67 | 5/5 pass | 5.21% | 88.4% |
| Example 68 | 5/5 pass | 5.22% | 89.1% |

It can be seen from the test results of Example 23 and Examples 67 and 68 that, use of the lithium salt additive and the compound containing a sulfur-oxygen double bond functional group in combination in the electrolytic solution can better improve the high-temperature cycle capacity retention rate of the battery.

K. Electrolytic solutions and lithium ion batteries in Examples 69 and 70 were prepared according to the foregoing preparation method, wherein the contents of substances in the electrolytic solutions were shown in Table 23.

TABLE 23

| No. | Compound containing a —CN functional group (wt %) I-2 | Compound containing a silicon functional group (wt %) II-5 | Boron-containing compound (wt %) IV-2 | Lithium salt additive (wt %) LiPO$_2$F$_2$ |
|---|---|---|---|---|
| Example 31 | 3 | 5 | 0.5 | — |
| Example 69 | 3 | 5 | 0.5 | 0.3 |
| Example 70 | 3 | 5 | 0.5 | 0.5 |

"—" represents substance present.

A temperature test, a 20% SOC impedance test and a 45° C. cycle test were performed on the batteries in Example 31 and Examples 69 and 70.

Test results were shown in Table 24.

TABLE 24

| No. | Temperature test | 20% SOC impedance/ mΩ | 45° C.-500-cycles capacity retention rate |
|---|---|---|---|
| Example 31 | 5/5 pass | 52 | 85.4% |
| Example 69 | 5/5 pass | 53 | 87.3% |
| Example 70 | 5/5 pass | 55 | 88.0% |

It can be seen from the test results of Example 31 and Examples 69 and 70 that, use of the lithium salt additive and the boron-containing compound in combination in the electrolytic solution can improve the high-temperature cycle capacity retention rate of the battery.

L. The electrolytic solutions and lithium ion batteries in Examples 71 and 72 were prepared according to the foregoing preparation method, wherein the contents of substances in the electrolytic solutions are shown in Table 25.

TABLE 25

| No. | Compound containing a —CN functional group (wt %) I-2 | Compound containing a silicon functional group (wt %) II-5 | Compound containing a sulfur-oxygen double bond functional group (wt %) III-1 | Boron containing compound (wt %) IV-2 | Lithium salt additive (wt %) LiPO$_2$F$_2$ |
|---|---|---|---|---|---|
| Example 38 | 3 | 5 | 4 | 0.5 | — |
| Example 71 | 3 | 5 | 4 | 0.5 | 0.3 |
| Example 72 | 3 | 5 | 4 | 0.5 | 0.5 |

"—" represents substance not present.

A temperature test, a 4.4 V storage test, a 20% SOC impedance test and a 45° C. cycle test were performed on the batteries in Example 38 and Examples 71 and 72.

The test results are shown in Table 26.

TABLE 26

| No. | Temperature test | 60° C.-4.4 V 21 days thickness swelling rate | 20% SOC impedance/ mΩ | 45° C.-500-cycles capacity retention rate |
|---|---|---|---|---|
| Example 38 | 5/5 pass | 5.40% | 53 | 85.5% |
| Example 71 | 5/5 pass | 5.42% | 54 | 87.5% |
| Example 72 | 5/5 pass | 5.45% | 55 | 89.2% |

It can be seen from the test results of Example 38 and Examples 71 and 72 that, the high-temperature capacity retention rate of the battery can be improved.

M. The electrolytic solutions and lithium ion batteries in Examples 73 and 74 were prepared according to the foregoing preparation method, wherein the contents of the substances in the electrolytic solutions are shown in Table 27.

TABLE 27

| No. | Compound containing a —CN functional group (wt %) I-2 | Compound containing a silicon functional group (wt %) II-5 | Isocyanurate compound (wt %) V-1 | Lithium salt additive (wt %) LiPO$_2$F$_2$ |
|---|---|---|---|---|
| Example 44 | 3 | 5 | 2 | — |
| Example 73 | 3 | 5 | 2 | 0.3 |
| Example 74 | 3 | 5 | 2 | 0.5 |

"—" represents substance not present.

A temperature test, a 25° C. cycle test and a 45° C. cycle test were performed on the batteries in Example 44 and Examples 73 and 74.

The test results are shown in Table 28.

TABLE 28

| No. | Temperature test | 25° C.-800-cycles capacity retention rate | 45° C.-500-cycles capacity retention rate |
|---|---|---|---|
| Example 44 | 5/5 pass | 86.6% | 85.8% |
| Example 73 | 5/5 pass | 87.2% | 87.2% |
| Example 74 | 5/5 pass | 88.1% | 87.9% |

It can be seen from the test results of Example 44 and Examples 73 and 74 that, the normal-temperature and high-temperature cycle capacity retention rates of the battery can be improved.

N. The electrolytic solutions and lithium ion batteries in Examples 75 and 76 were prepared according to the foregoing preparation method, wherein the contents of the substances in the electrolytic solutions are shown in Table 29.

TABLE 29

| No. | Compound containing a —CN functional group (wt %) I-2 | Compound containing a silicon functional group (wt %) II-5 | Compound containing a sulfur-oxygen double bond functional group (wt %) III-1 | Boron-containing compound (wt %) IV-2 | Isocyanurate compound (wt %) V-1 | Lithium salt additive (wt %) LiPO$_2$F$_2$ |
|---|---|---|---|---|---|---|
| Example 53 | 3 | 5 | 4 | 0.5 | 2 | — |
| Example 75 | 3 | 5 | 4 | 0.5 | 2 | 0.3 |
| Example 76 | 3 | 5 | 4 | 0.5 | 2 | 0.5 |

"—" represents substance not present.

A temperature test, a 4.4 V storage test, a 20% SOC impedance test, a 25° C. cycle test and a 45° C. cycle test were performed on the batteries in Example 53 and Examples 75 and 76.

The test results are shown in Table 30.

TABLE 30

| No. | Temperature test | 60° C.-4.4 V 21 days thickness swelling rate | 20% SOC impedance/ mΩ | 25° C.-800-cycles capacity retention rate | 45° C.-500-cycles capacity retention rate |
|---|---|---|---|---|---|
| Example 53 | 5/5 pass | 5.30% | 53 | 85.2% | 85.9% |
| Example 75 | 5/5 pass | 5.40% | 58 | 86% | 87.5% |
| Example 76 | 5/5 pass | 5.45% | 55 | 86.5% | 89.3% |

It can be seen from the test results of Example 53 and Examples 75 and 76 that, the high-temperature cycle capacity retention rate of the battery can be improved.

O. The electrolytic solutions and lithium ion batteries in Examples 77-81 were prepared according to the foregoing preparation method, wherein the contents of the substances in the electrolytic solutions are shown in Table 31.

TABLE 31

| No. | Compound containing a —CN functional group (wt %) I-2 | Compound containing a silicon functional group (wt %) II-5 | Additive Butanedinitrile | 1,3-dioxolan | Diethoxymethane | Trimethylphosphate | Fluorobenzene |
|---|---|---|---|---|---|---|---|
| Example 6 | 3 | 5 | — | — | — | — | — |
| Example 77 | 3 | 5 | 3 | — | — | — | — |
| Example 78 | 3 | 5 | — | 1 | — | — | — |
| Example 79 | 3 | 5 | — | — | 5 | — | — |
| Example 80 | 3 | 5 | — | — | — | 5 | — |
| Example 81 | 3 | 5 | — | — | — | — | 7 |

"—" represents substance not present.

A temperature test, a hot box test, and an overcharge performance test were performed on the batteries in Example 6 and Examples 77-81, wherein the processes of the hot box test and the overcharge test were as follows:

Test 8. Hot Box Test:

The battery was charged to 4.4 V at 0.7 C at a temperature of 25° C. and then charged to 0.05 C under the constant voltage of 4.4 V. Next, the battery was placed into a test chamber, and the test chamber was heated at a rate of 5° C./min. Heating was stopped when the temperature in the box reached 150° C.±5° C., and the temperature was maintained for 60 min. The battery passes the test if it does not burn or explode.

Test 9. Overcharge Test:

The battery was charged to 6 V at 3 C at a temperature of 25° C. and then charged at the constant voltage of 6 V. Temperature changes of the battery were detected during the test. The test was terminated upon occurrence of one of the following two situations:

a) a continuous charging time of the battery reached 7 hours; and b) the temperature of the battery lowered to a value that was 20% less than a peak value.

The battery passed the test if it did not burn or explode.

The test results are shown in Table 32.

TABLE 32

| No. | Temperature test | Hot box | Overcharge test |
|---|---|---|---|
| Example 6 | 5/5 pass | 3/5 pass | 3/5 pass |
| Example 77 | 5/5 pass | 5/5 pass | 3/5 pass |
| Example 78 | 5/5 pass | 4/5 pass | 3/5 pass |
| Example 79 | 5/5 pass | 3/5 pass | 4/5 pass |
| Example 80 | 5/5 pass | 3/5 pass | 5/5 pass |
| Example 81 | 5/5 pass | 2/5 pass | 4/5 pass |

It can be seen from the test results of Example 6 and Examples 77-81 that, the safety performance of the battery was improved to some extent.

References throughout the specification to "embodiments", "partial embodiments", "one embodiment", "another example", "example", "specific example" or "partial examples" mean that at least one embodiment or example of the application includes specific features, structures, materials or characteristics described in the embodiments or examples. Thus, the descriptions appear throughout the specification, such as "in some embodiments", "in an embodiment", "in one embodiment", "in another example", "in an example", "in a particular example" or "for example", are not necessarily the same embodiment or example in the application. Furthermore, the particular features, structures, materials or characteristics herein may be combined in any suitable manner in one or more embodiments or examples.

While the illustrative embodiments have been shown and described, it will be understood by a person skilled in the art that the embodiments are not to be construed as limiting the present application, and modifications, substitutions and changes can be made to the embodiments without departing from the spirit, principle, and scope of the present application.

What is claimed is:

1. An electrolytic solution, comprising: a compound containing a —CN functional group and a compound containing a silicon functional group; wherein the compound containing the —CN functional group comprises at least one of the following compounds:

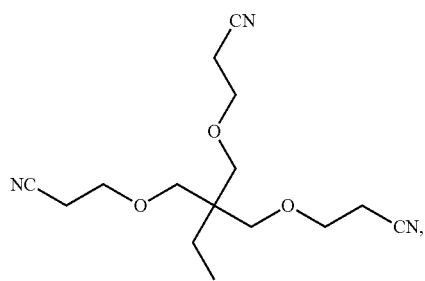 (I-1)

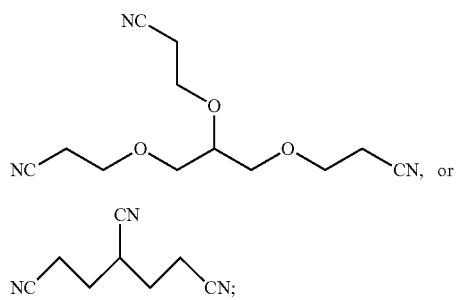 (I-2)

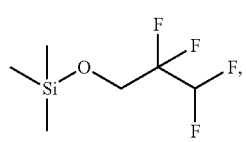 (I-7)

the compound containing the silicon functional group comprises at least one of the following compounds:

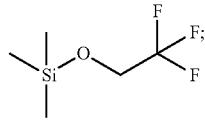 (II-1)

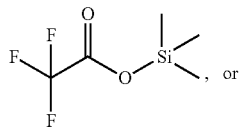 (II-5)

, or

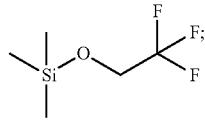 (II-6)

based on a total weight of the electrolytic solution, a weight percentage of the compound containing the —CN functional group is about 1 wt % to about 10 wt %, and a weight percentage of the compound containing the silicon functional group is about 0.1 wt % to about 30 wt %.

2. The electrolytic solution according to claim 1, further comprising a compound containing a sulfur-oxygen double bond functional group, wherein the compound containing the sulfur-oxygen double bond functional group comprises a compound represented by formula III-A:

 (III-A)

wherein $R_{31}$ is selected from a substituted or non-substituted $C_1$-$C_{12}$ alkylene group, a substituted or non-substituted $C_2$-$C_{12}$ alkenylene group, a heteroatom-containing substituted or non-substituted $C_1$-$C_{12}$ alkylene group, or a heteroatom-containing substituted or non-substituted $C_2$-$C_{12}$ alkenylene group;

wherein when being substituted, a substituent group is selected from a halogen, a $C_1$-$C_6$ alkyl group, a $C_2$-$C_6$ alkenyl group or any combination thereof; and the heteroatom is selected from O, S, P or any combination thereof.

3. The electrolytic solution according to claim 2, wherein the compound containing the sulfur-oxygen double bond functional group comprises at least one of the following compounds:

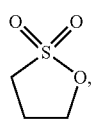 (formula III-1)

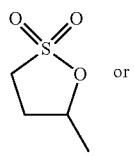 or (formula III-2)

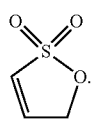 (formula III-3)

4. The electrolytic solution according to claim 1, further comprising a boron-containing compound, wherein the boron-containing compound comprises a compound represented by formula IV-A:

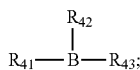

(IV-A)

wherein $R_{41}$, $R_{42}$, and $R_{43}$ are each independently selected from $R^b$—Si—$(R^c)_3$, a substituted or non-substituted $C_1$-$C_{12}$ alkyl group, a substituted or non-substituted $C_1$-$C_{12}$ alkoxy group, a substituted or non-substituted $C_2$-$C_{12}$ alkenyl group, a substituted or non-substituted $C_6$-$C_{26}$ aryl group, or a substituted or non-substituted $C_3$-$C_{10}$ cyclohydrocarbon group;

wherein $R^b$ is selected from a substituted or non-substituted $C_1$-$C_{12}$ alkylene group, a substituted or non-substituted $C_2$-$C_{12}$ alkenylene group, a substituted or non-substituted $C_6$-$C_{10}$ cycloalkylene group, or a substituted or non-substituted $C_6$-$C_{26}$ arylene group;

wherein $R^c$ is selected from H, F, a substituted or non-substituted $C_1$-$C_{12}$ alkyl group, a substituted or non-substituted $C_1$-$C_{12}$ alkoxy group, a substituted or non-substituted $C_2$-$C_{12}$ alkenyl group, a substituted or non-substituted $C_6$-$C_{10}$ cyclohydrocarbon group, or a substituted or non-substituted $C_6$-$C_{26}$ aryl group; and wherein when substituted, a substituent is selected from a halogen, a $C_1$-$C_6$ alkyl group, a $C_1$-$C_6$ alkenyl group, a cyano group or any combination thereof.

5. The electrolytic solution according to claim 4, wherein the boron-containing compound comprises at least one of the following compounds:

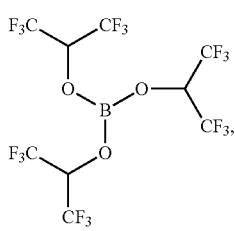

(formua IV-1)

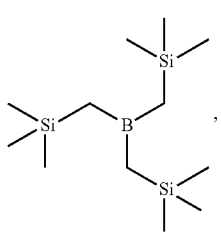

(formula IV-2)

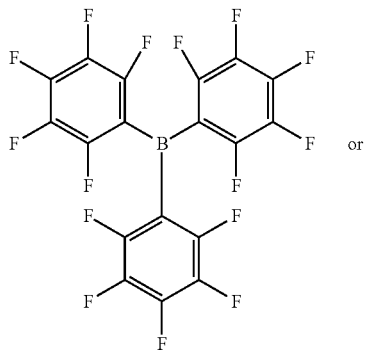

(formula IV-3)

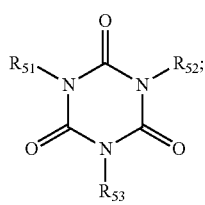

(formula IV-4)

and wherein based on the total weight of the electrolytic solution, a weight percentage of the boron-containing compound is about 0.01 wt % to about 10 wt %.

6. The electrolytic solution according to claim 1, further comprising an isocyanurate compound, wherein the isocyanurate compound comprises a compound represented by formula V-A:

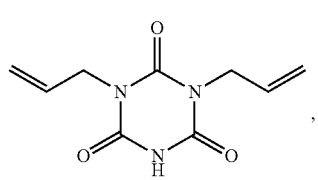

(V-A)

wherein $R_{51}$, $R_{52}$, and $R_{53}$ are each independently selected from H, a halogen, a substituted or non-substituted $C_1$-$C_{12}$ alkyl group, a substituted or non-substituted $C_2$-$C_{12}$ alkenyl group, a substituted or non-substituted $C_6$-$C_{26}$ aryl group, or a substituted or non-substituted $C_1$-$C_{10}$ heterocyclyl group; and wherein when being substituted, a substituent is selected from a halogen, a $C_1$-$C_6$ alkyl group, a $C_2$-$C_6$ alkenyl group or any combination thereof.

7. The electrolytic solution according to claim 6, wherein the isocyanurate compound comprises at least one of the following compounds:

(formula V-1)

-continued

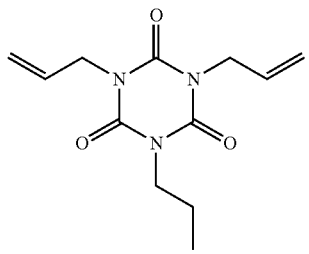
(formula V-2)

or

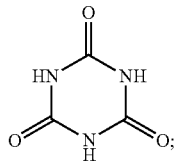
(formula V-3)

and
wherein based on the total weight of the electrolytic solution, a weight percentage of the isocyanurate compound is about 0.01 wt % to about 10 wt %.

8. The electrolytic solution according to claim 1, further comprising a lithium salt additive, wherein the lithium salt additive comprises at least one of the following lithium salts: lithium bistrifluoromethanesulfonimide, lithium bis(fluorosulfonyl)imide, lithium bisoxalatoborate, lithium tetrafluorooxalatophosphate, lithium difluorooxalatoborate or lithium difluorophosphate, and wherein based on the total weight of the electrolytic solution, a weight percentage of the lithium salt additive is about 0.01 wt % to about 10 wt %.

9. An electrochemical device, comprising an electrolytic solution, the electrolytic solution comprises: a compound containing a —CN functional group and a compound containing a silicon functional group; wherein
the compound containing the —CN functional group comprises at least one of the following compounds:

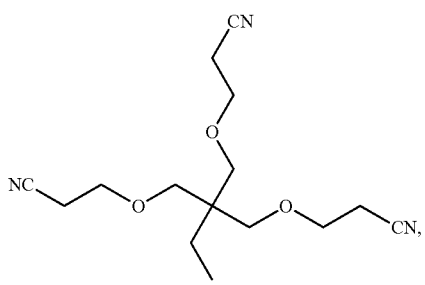
(I-1)

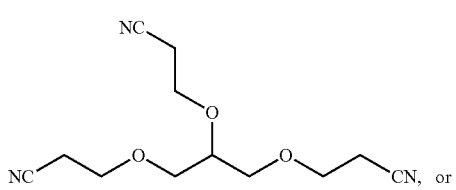
(I-2)

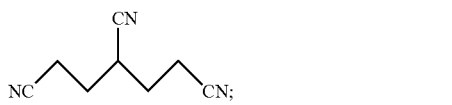
(I-7)

the compound containing the silicon functional group comprises at least one of the following compounds:

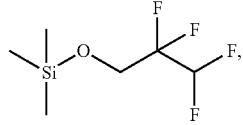
(II-1)

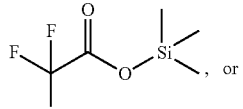
(II-5)

, or

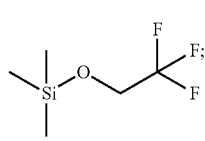
(II-6)

based on a total weight of the electrolytic solution, a weight percentage of the compound containing the —CN functional group is about 1 wt % to about 10 wt %, and a weight percentage of the compound containing the silicon functional group is about 0.1 wt % to about 30 wt %.

10. The electrochemical device according to claim 9, the electrolytic solution further comprising a compound containing a sulfur-oxygen double bond functional group, wherein the compound containing the sulfur-oxygen double bond functional group comprises a compound represented by formula III-A:

(III-A)

wherein $R_{31}$ is selected from a substituted or non-substituted $C_1$-$C_{12}$ alkylene group, a substituted or non-substituted $C_2$-$C_{12}$ alkenylene group, a heteroatom-containing substituted or non-substituted $C_1$-$C_{12}$ alkylene group, or a heteroatom-containing substituted or non-substituted $C_2$-$C_{12}$ alkenylene group;
wherein when being substituted, a substituent group is selected from a halogen, a $C_1$-$C_6$ alkyl group, a $C_2$-$C_6$ alkenyl group or any combination thereof; and
the heteroatom is selected from O, S, P or any combination thereof.

11. The electrochemical device according to claim 9, the electrolytic solution further comprising a boron-containing compound, wherein the boron-containing compound comprises a compound represented by formula IV-A:

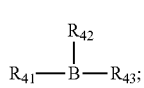
(IV-A)

wherein $R_{41}$, $R_{42}$, and $R_{43}$ are each independently selected from $R^b$—Si—$(R^c)_3$, a substituted or non-substituted $C_1$-$C_{12}$ alkyl group, a substituted or non-substituted $C_1$-$C_{12}$ alkoxy group, a substituted or non-substituted $C_2$-$C_{12}$ alkenyl group, a substituted or non-substituted $C_6$-$C_{26}$ aryl group, or a substituted or non-substituted $C_3$-$C_{10}$ cyclohydrocarbon group;

wherein $R^b$ is selected from a substituted or non-substituted $C_1$-$C_{12}$ alkylene group, a substituted or non-substituted $C_2$-$C_{12}$ alkenylene group, a substituted or non-substituted $C_6$-$C_{10}$ cycloalkylene group, or a substituted or non-substituted $C_6$-$C_{26}$ arylene group;

wherein $R^c$ is selected from H, F, a substituted or non-substituted $C_1$-$C_{12}$ alkyl group, a substituted or non-substituted $C_1$-$C_{12}$ alkoxy group, a substituted or non-substituted $C_2$-$C_{12}$ alkenyl group, a substituted or non-substituted $C_6$-$C_{10}$ cyclohydrocarbon group, or a substituted or non-substituted $C_6$-$C_{26}$ aryl group; and wherein when substituted, a substituent is selected from a halogen, a $C_1$-$C_6$ alkyl group, a $C_1$-$C_6$ alkenyl group, a cyano group or any combination thereof.

12. The electrochemical device according to claim 9, the electrolytic solution further comprising an isocyanurate compound, wherein the isocyanurate compound comprises a compound represented by formula V-A:

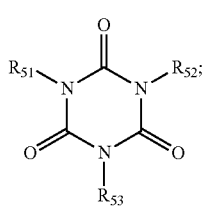

(V-A)

wherein $R_{51}$, $R_{52}$, and $R_{53}$ are each independently selected from H, a halogen, a substituted or non-substituted $C_1$-$C_{12}$ alkyl group, a substituted or non-substituted $C_2$-$C_{12}$ alkenyl group, a substituted or non-substituted $C_6$-$C_{26}$ aryl group, or a substituted or non-substituted $C_1$-$C_{10}$ heterocyclyl group; and wherein when being substituted, a substituent is selected from a halogen, a $C_1$-$C_6$ alkyl group, a $C_2$-$C_6$ alkenyl group or any combination thereof.

13. An electronic device, comprising an electrochemical device, the electrochemical device comprises an electrolytic solution, the electrolytic solution comprises a compound containing a —CN functional group and a compound containing a silicon functional group, wherein the compound containing the —CN functional group comprises at least one of the following compounds:

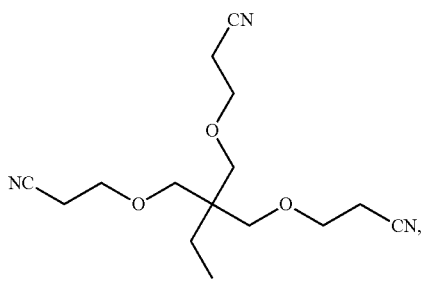

(I-1)

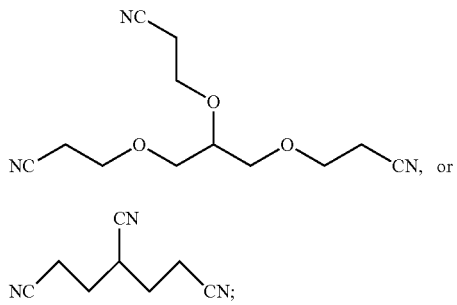

(I-2)

(I-7)

the compound containing the silicon functional group comprises at least one of the following compounds:

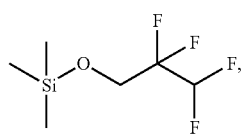

(II-1)

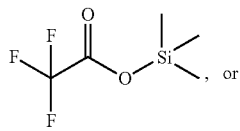

(II-5)

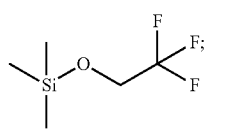

(II-6)

based on a total weight of the electrolytic solution, a weight percentage of the compound containing the —CN functional group is about 1 wt % to about 10 wt %, and a weight percentage of the compound containing the silicon functional group is about 0.1 wt % to about 30 wt %.

14. The electrochemical device according to claim 9, the electrolytic solution further comprising a lithium salt additive, wherein the lithium salt additive comprises at least one of the following lithium salts: lithium bistrifluoromethanesulfonimide, lithium bis(fluorosulfonyl)imide, lithium bisoxalatoborate, lithium tetrafluorooxalatophosphate, lithium difluorooxalatoborate or lithium difluorophosphate, and wherein based on the total weight of the electrolytic solution, a weight percentage of the lithium salt additive is about 0.1 wt % to about 5 wt %.

15. The electrochemical device according to claim 10, wherein the compound containing the sulfur-oxygen double bond functional group comprises at least one of the following compounds:

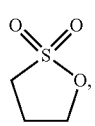

(formula III-1)

-continued

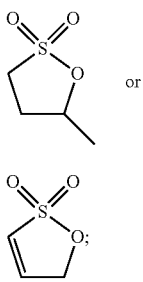
(formula III-2)

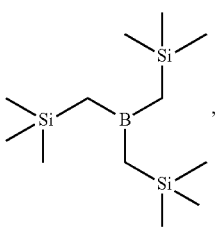
(formula III-3)

based on the total weight of the electrolytic solution, the weight percentage of the compound containing the sulfur-oxygen double bond functional group is about 0.1 wt % to about 5 wt %.

16. The electrochemical device according to claim 11, wherein the boron-containing compound comprises at least one of the following compounds:

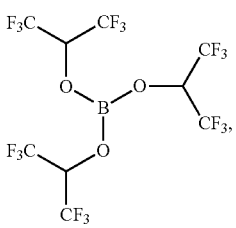
(formua IV-1)

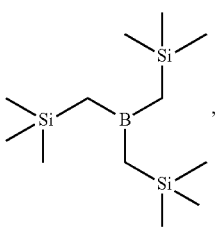
(formula IV-2)

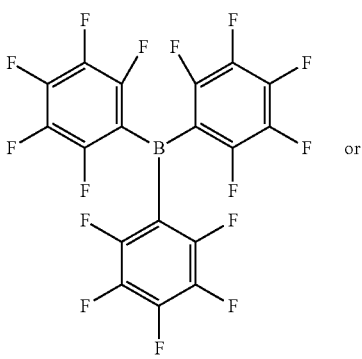
(formula IV-3)

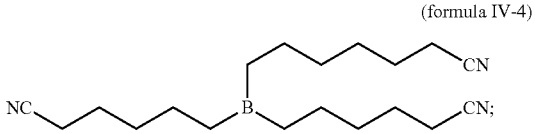
(formula IV-4)

and
wherein based on the total weight of the electrolytic solution, a weight percentage of the boron-containing compound is about 0.1 wt % to about 5 wt %.

17. The electrochemical device according to claim 12, wherein the isocyanurate compound comprises at least one of the following compounds:

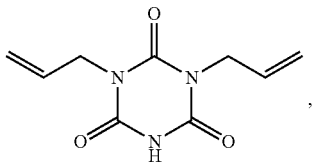
(formula V-1)

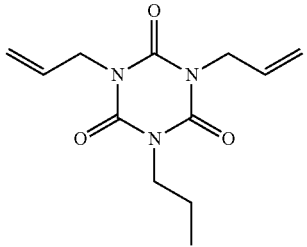
(formula V-2)

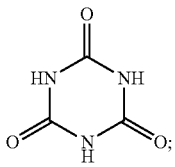
(formula V-3)

and
wherein based on the total weight of the electrolytic solution, a weight percentage of the isocyanurate compound is about 0.1 wt % to about 5 wt %.

18. The electrochemical device according to claim 14, the electrolytic solution further comprising a compound containing a sulfur-oxygen double bond functional group, wherein the compound containing the sulfur-oxygen double bond functional group comprises a compound represented by formula III-A:

(III-A)

wherein $R_{31}$ is selected from a substituted or non-substituted $C_1$-$C_{12}$ alkylene group, a substituted or non-substituted $C_2$-$C_{12}$ alkenylene group, a heteroatom-containing substituted or non-substituted $C_1$-$C_{12}$ alkylene group, or a heteroatom-containing substituted or non-substituted $C_2$-$C_{12}$ alkenylene group;

wherein when being substituted, a substituent group is selected from a halogen, a $C_1$-$C_6$ alkyl group, a $C_2$-$C_6$ alkenyl group or any combination thereof; and the heteroatom is selected from O, S, P or any combination thereof.

19. The electrochemical device according to claim 14, the electrolytic solution further comprising a compound containing a sulfur-oxygen double bond functional group, a boron-containing compound and an isocyanurate compound;

wherein the compound containing the sulfur-oxygen double bond functional group comprises a compound represented by formula III-A:

(III-A)

wherein $R_{31}$ is selected from a substituted or non-substituted $C_1$-$C_{12}$ alkylene group, a substituted or non-substituted $C_2$-$C_{12}$ alkenylene group, a heteroatom-containing substituted or non-substituted $C_1$-$C_{12}$ alkylene group, or a heteroatom-containing substituted or non-substituted $C_2$-$C_{12}$ alkenylene group;

wherein when being substituted, a substituent group is selected from a halogen, a $C_1$-$C_6$ alkyl group, a $C_2$-$C_6$ alkenyl group or any combination thereof; and the heteroatom is selected from O, S, P or any combination thereof;

wherein the boron-containing compound comprises a compound represented by formula IV-A:

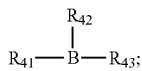

(IV-A)

wherein $R_{41}$, $R_{42}$, and $R_{43}$ are each independently selected from $R^b$—Si—$(R^c)_3$, a substituted or non-substituted $C_1$-$C_{12}$ alkyl group, a substituted or non-substituted $C_1$-$C_{12}$ alkoxy group, a substituted or non-substituted $C_2$-$C_{12}$ alkenyl group, a substituted or non-substituted $C_6$-$C_{26}$ aryl group, or a substituted or non-substituted $C_3$-$C_{10}$ cyclohydrocarbon group;

wherein $R^b$ is selected from a substituted or non-substituted $C_1$-$C_{12}$ alkylene group, a substituted or non-substituted $C_2$-$C_{12}$ alkenylene group, a substituted or non-substituted $C_6$-$C_{10}$ cycloalkylene group, or a substituted or non-substituted $C_6$-$C_{26}$ arylene group;

wherein $R^c$ is selected from H, F, a substituted or non-substituted $C_1$-$C_{12}$ alkyl group, a substituted or non-substituted $C_1$-$C_{12}$ alkoxy group, a substituted or non-substituted $C_2$-$C_{12}$ alkenyl group, a substituted or non-substituted $C_6$-$C_{10}$ cyclohydrocarbon group, or a substituted or non-substituted $C_6$-$C_{26}$ aryl group; and wherein when substituted, a substituent is selected from a halogen, a $C_1$-$C_6$ alkyl group, a $C_1$-$C_6$ alkenyl group, a cyano group or any combination thereof;

wherein the isocyanurate compound comprises a compound represented by formula V-A:

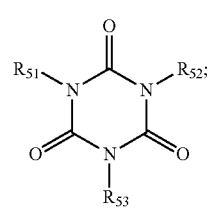

(V-A)

wherein $R_{51}$, $R_{52}$, and $R_{53}$ are each independently selected from H, a halogen, a substituted or non-substituted $C_1$-$C_{12}$ alkyl group, a substituted or non-substituted $C_2$-$C_{12}$ alkenyl group, a substituted or non-substituted $C_6$-$C_{26}$ aryl group, or a substituted or non-substituted $C_1$-$C_{10}$ heterocyclyl group; and wherein when being substituted, a substituent is selected from a halogen, a $C_1$-$C_6$ alkyl group, a $C_2$-$C_6$ alkenyl group or any combination thereof;

based on the total weight of the electrolytic solution, the weight percentage of the compound containing the sulfur-oxygen double bond functional group is about 0.1 wt % to about 5 wt %;

wherein based on the total weight of the electrolytic solution, a weight percentage of the boron-containing compound is about 0.1 wt % to about 5 wt %; and wherein based on the total weight of the electrolytic solution, a weight percentage of the isocyanurate compound is about 0.1 wt % to about 5 wt %.

* * * * *